United States Patent
Yahiaoui et al.

(10) Patent No.: US 10,416,350 B2
(45) Date of Patent: Sep. 17, 2019

(54) METHOD FOR EXPLOITATION OF A SUBTERRANEAN MEDIUM IN ACCORDANCE WITH AN EXPLOITATION SCHEME DEFINED BY AN OPTIMIZED REPRESENTATION

(71) Applicant: IFP Energies nouvelles, Rueil-Malmaison (FR)

(72) Inventors: Brahim Yahiaoui, Suresnes (FR); Abdallah Benali, Suresnes (FR); Chakib Bennis, Rueil-Malmaison (FR); Houman Borouchaki, Paris (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 1145 days.

(21) Appl. No.: 13/896,694

(22) Filed: May 17, 2013

(65) Prior Publication Data
US 2014/0052427 A1    Feb. 20, 2014

(30) Foreign Application Priority Data
May 22, 2012   (FR) ..................................... 12 01451

(51) Int. Cl.
*G01V 99/00*   (2009.01)
*G06T 17/05*   (2011.01)
*G06T 17/20*   (2006.01)

(52) U.S. Cl.
CPC ............ *G01V 99/005* (2013.01); *G06T 17/05* (2013.01); *G06T 17/205* (2013.01)

(58) Field of Classification Search
None
See application file for complete search history.

(56) References Cited

U.S. PATENT DOCUMENTS 8,504,300 B2 *   8/2013   Dorn .......................  G01V 1/30
                                                             702/14
8,711,140 B1 *   4/2014   Mallet .................  G01V 99/005
                                                            345/419
(Continued)

FOREIGN PATENT DOCUMENTS

FR          2 948 215          1/2011

OTHER PUBLICATIONS

Bennis et al, 3D line-support grid flattening for more accurate geostatistical reservoir population with petrophysical properties, Engineering with Computers (2014) 30:403-421 (published online Jan. 24, 2013).*

(Continued)

*Primary Examiner* — Hugh M Jones
*Assistant Examiner* — Robert S Brock
(74) *Attorney, Agent, or Firm* — Fitch, Even, Tabin & Flannery LLP

(57) ABSTRACT

The invention is a method for exploiting a subterranean medium, according to an exploitation scheme defined on a representation of the medium based on a two-dimensional grid representing the subterranean medium. The quality of the mesh cells of the grid is optimized by displacing the nodes of the grid by a procedure for minimizing the deformation of the grid by generating a reference grid; imposing a displacement of at least one node, termed a rigid node, of the reference grid on a corresponding node in the grid to be optimized; and constructing an optimized two-dimensional grid by displacement of the other nodes of the reference grid, while minimizing the displacement field of the nodes.

17 Claims, 16 Drawing Sheets

(56) References Cited

U.S. PATENT DOCUMENTS

| | | | | |
|---|---|---|---|---|
| 8,743,115 | B1* | 6/2014 | Mallet | G01V 1/302 |
| | | | | 345/419 |
| 8,965,745 | B2* | 2/2015 | Lepage | G01V 99/005 |
| | | | | 703/10 |
| 9,959,662 | B2* | 5/2018 | Mitchell | G06T 15/04 |
| 2001/0007451 | A1* | 7/2001 | Aono | G06T 11/203 |
| | | | | 345/442 |
| 2004/0194051 | A1* | 9/2004 | Croft | G06F 17/5018 |
| | | | | 703/2 |
| 2006/0267978 | A1* | 11/2006 | Litke | G06T 17/20 |
| | | | | 345/419 |
| 2008/0243454 | A1* | 10/2008 | Mallet | G01V 11/00 |
| | | | | 703/6 |
| 2010/0017181 | A1* | 1/2010 | Mouton | G06T 17/20 |
| | | | | 703/9 |
| 2011/0015910 | A1* | 1/2011 | Ran | G06T 17/20 |
| | | | | 703/2 |
| 2011/0106507 | A1* | 5/2011 | Lepage | G01V 11/00 |
| | | | | 703/2 |
| 2012/0022837 | A1* | 1/2012 | Asbury | G06T 17/05 |
| | | | | 703/2 |
| 2013/0124161 | A1* | 5/2013 | Poudret | G01V 99/005 |
| | | | | 703/2 |
| 2013/0204598 | A1* | 8/2013 | Mallet | G06F 17/5009 |
| | | | | 703/6 |
| 2013/0218539 | A1* | 8/2013 | Souche | G01V 99/005 |
| | | | | 703/2 |
| 2016/0125555 | A1* | 5/2016 | Branets | G01V 99/005 |
| | | | | 705/348 |
| 2016/0245951 | A1* | 8/2016 | Kartasheva | G01V 99/005 |
| 2018/0031721 | A1* | 2/2018 | Etiene Queiroz | G01V 1/48 |
| 2018/0232950 | A1* | 8/2018 | Brewer | G06T 17/205 |

OTHER PUBLICATIONS

Horna et al, Isometric Unfolding of Stratigraphic Grid Units for Accurate Property Populating: Mathematical Concepts, EAGE, European Conference on the Mathematics of Oil Recovery, Sep. 2010, Oxford, United Kingdom, 14 pages.*

Frantz Maerten, Chaper 11 of Geomechanics to solve geological structure issues: forward, inverse and restoration modeling, Geophysics, Universite Montpellier II Sciences et Techniques du Languedoc, pp. 331-357, 2010.*

Jean-François Rainaud, Vincent Clochard, Thomas Crabié, and Houman Borouchaki, Using a ChronoStratigraphic Unfolding Workflow to build an a priori model for Stratigraphic Inversion with accurate Horizon and Fault Fitting, SEG Technical Program Expanded Abstracts 2015: pp. 1927-1931.*

Ran, Longmin, Hex-dominant mesh generation for subterranean formation modeling, Engineering with Computers, 28, pp. 255-268, 2011.*

Brahim Yahiaoui, Houman Borouchaki, Abdallah Benali, Hex-Dominant Mesh Improving Quality to Tracking Hydrocarbons in Dynamic Basins, Oil & Gas Science and Technology—Revue d'IFP Energies nouvelles, Institut Francais du Petrole, 2014, 69 (4), pp. 565-572.*

Brahim Yahiaoui, Section 5.2 of Maillage dynamique tridimensionnel pour la simulation de l'ecoulement dans un bassin sedimentaire, Dissertation, pp. 103-112, Dec. 17, 2013.*

Poudret, Mathieu et al, A Volume Flattening Methodology for Geostatistical Properties Estimation, Proceedings of the 20th International Meshing Roundtable, Springer, pp. 569-585, Jan. 2012.*

Mello et al. Tulsa: AAPG/Datapages Discovery Series 7 (2003): 27 pages. Obtained from https://www.researchgate.net/profile/Paulo_Cavalcanti/publication/228592962_A_Topologically-based_Framework_for_Three-dimensional_Basin_Modeling/links/0912f50d57a58188dd000000.pdf on May 10, 2018 (Year: 2003).*

D'Azevedo, Eduardo F., and R. Bruce Simpson. "On optimal triangular meshes for minimizing the gradient error." Numerische Mathennatik 59, No. 1 (1991): 321-348. (Year: 1991).*

Canann, et al. "An Approach to Combined Laplacian and Optimization-Based Smoothing for Triangular, Quadrilateral, and Quad-Dominant Meshes." In IMR, 16 pages. 1998. Obtained from http://citeseerx.ist.psu.edu/viewdoc/download?doi=10.1.1.88.9616&rep=rep1&type=pdf on May 10, 2018 (Year: 1998).*

Oscar Kin-Chung Au et al: "Dual Laplacian Editing for Meshes", IEEE Transactions on Visualization and Computer Graphics, vol. 12, No. 3, pp. 386-395, Hangzhou-China, May/Jun. 2006.

H. Masuda et al: "Interactive Mesh Deformation Using Equality-Constrained Least Squares", Tokyo, Japan, May 2006. (24 pages).

Mathieu Desbrun et al: "Intrinsic Parameterizations of Surface Meshes", Eurographics 2002, vol. 21, No. 2, Oxford UK, 2002. (10 pages).

Yanzhen Wang et al: "2D Shape Deformation Based on Rigid Square Matching", Computer Animation and Virtual Worlds, pp. 411-420, Changsha-China, Aug. 2008.

* cited by examiner

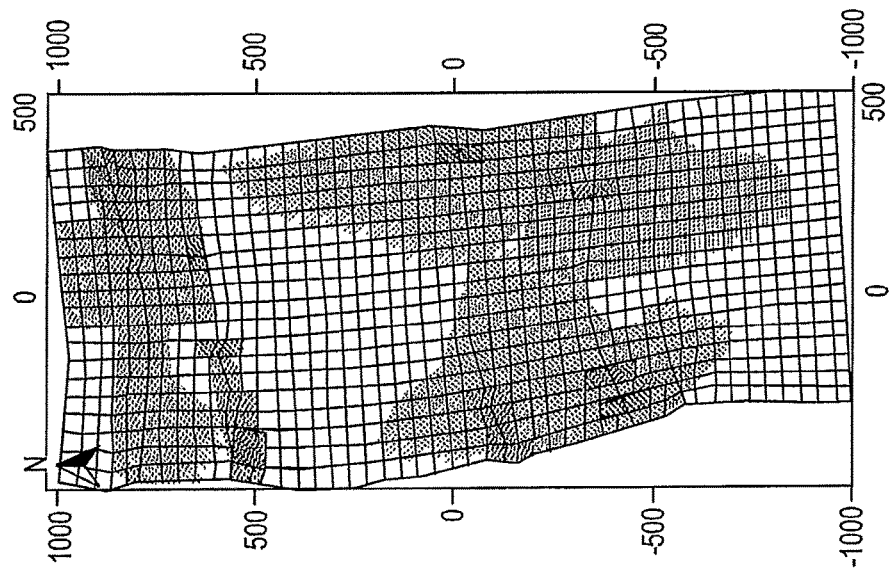
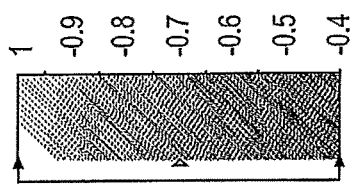
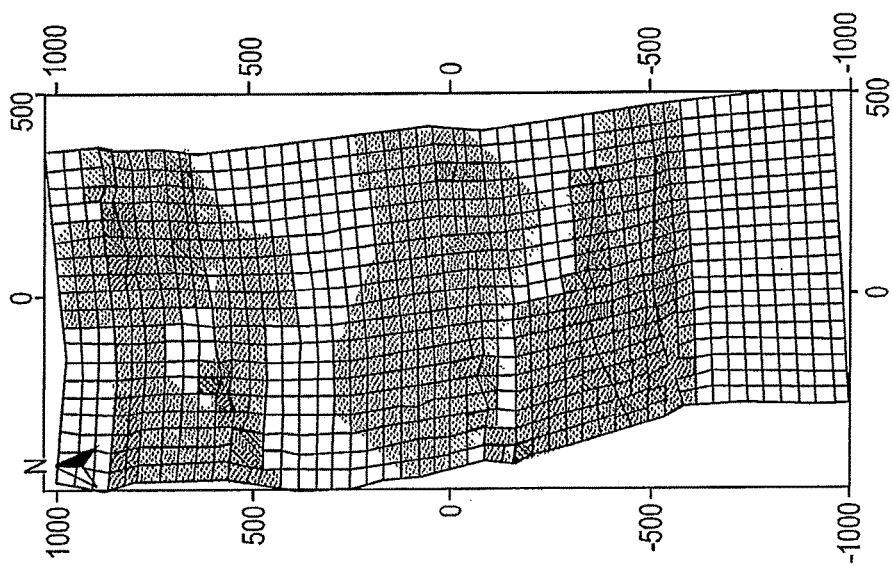
FIG. 3B
FIG. 3
FIG. 3A

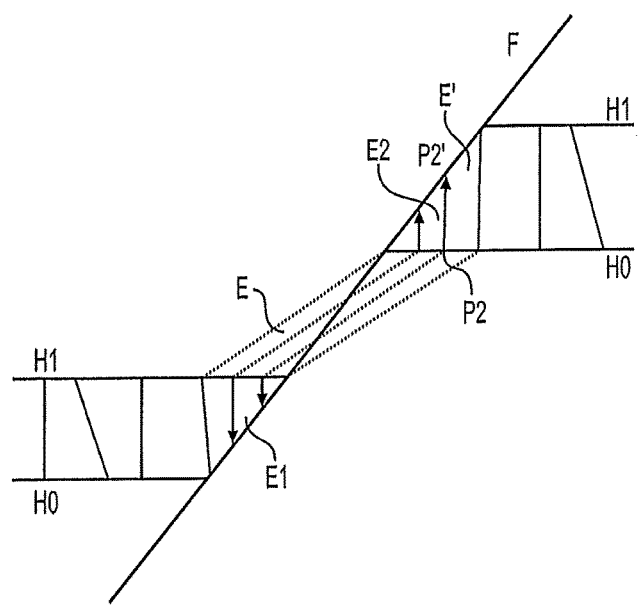
FIG. 18
*(PRIOR ART)*
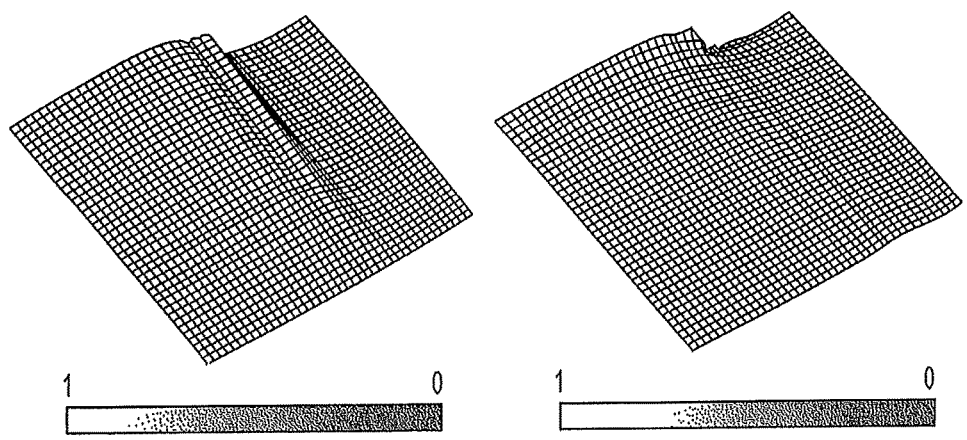
FIG. 19A          FIG. 19B

METHOD FOR EXPLOITATION OF A SUBTERRANEAN MEDIUM IN ACCORDANCE WITH AN EXPLOITATION SCHEME DEFINED BY AN OPTIMIZED REPRESENTATION

BACKGROUND OF THE INVENTION

Field of the Invention

The present invention relates to the field of oil exploration, and more particularly the study of fluid flows within a subterranean formation. The method in particular relates to the study of the displacements of fluids such as hydrocarbons in a deposit, or subterranean reservoir, traversed by faults which is carried out with basin modeling, reservoir simulation, and/or simulations of CO2 injection into a subterranean formation.

Description of the Prior Art

The goal of basin modeling is to reconstruct the geological history of a sedimentary basin and its oil systems to help to locate hydrocarbon traps known as reservoirs, to estimate their quantity and quality, and finally, to evaluate the risks of encountering pressure excesses during drilling. Reservoir simulation studies the evolution over time of the proportions of water, gas and petroleum in the reservoir in order to assess profitability, to validate or to optimize the position of the wells ensuring operation of the reservoir exploitation. In an era where durable development and the protection of the environment are becoming paramount, a third study related to oil exploration performs simulations for the injection of CO2 into a porous subterranean medium.

Basin modeling, reservoir simulation and CO2 simulation are techniques based on the simulation of flow in a porous medium. A representation of the subterranean medium, also called a reservoir model, constitutes a mockup of the subsoil, representative both of the structure and of its behavior. Generally this type of mockup is represented on a computer. A flow simulator is software making possible, inter alia, modelling the production of a deposit as a function of time, on the basis of measurements describing the deposit, on the basis of a representation of the subterranean medium. These simulations are carried out by a system of partial differential equations by finite volume procedures on a meshed model of the subterranean medium concerned.

Today, exploration is concerned with zones with complex geometry where faults are numerous and their positions random. The automatic construction of a 3D mesh capable of representing this geometric complexity is the first indispensable step in the formulation of the simulation software, the flow simulator, for such a medium, on the basis of the horizons which delimit the various geological layers, and of the faults which cut the horizons. The horizons and the faults are provided as surfaces, triangulated on the basis of a net of points. These points generally result from seismic surveys. Having regard for the flow simulators used in the industry, it is necessary that the mesh comprises as many hexahedral elements as possible so as to allow a better result of the simulation.

For example, three basin simulation software packages have been developed at IFP Energies nouvelles, namely Temis 2D®, Temis 3D® and Ceres 2D®. The first two software packages make possible modeling of the basin but neglect the presence of faults, whereas the last is suitable for taking faults into account in the two-dimensional case.

To obtain a three-dimensional mesh with as many hexahedral elements as possible, it is necessary that the two-dimensional grids making possible construction of the three-dimensional mesh comprise a maximum of elements of optimal shape, that is to say substantially rectangular, and that the other elements of the grid not be degenerate, that is with angles far removed from right angles. FIG. 1 represents a two-dimensional grid comprising several degenerate quadrilaterals, which have to be deformed to obtain a mesh that is optimized for the simulations.

Furthermore, a procedure has been developed, referred to as the constrained grid procedure and described in particular in patent application FR 2 948 215, for constructing a suitable mesh, representing a subterranean medium comprising several faults. This procedure is based on carrying out the following steps:

- transformation of three-dimensional surfaces corresponding to the geological horizons into two-dimensional surfaces, onto which the faults are projected,
- generation of regular two-dimensional grids,
- deformation of the regular two-dimensional grids to fit the nodes of the mesh cells to take faults into account,
- transformation of the deformed regular two-dimensional grids into three-dimensional gridded surfaces, and
- construction of the mesh of the subterranean medium by linking the mesh cells of the grids of the geological horizons.

The meshes constructed with the constrained grid procedure are very well suited to the problems of basin studies, since the procedure processes a large number of mesh cells with complex geometry. Moreover, the procedure makes it possible as it were to project each horizon topology onto another horizon.

The procedure for fitting the faults, proposed by this procedure, advances over a fault trace from one extremity to the other while fitting the closest nodes on the traces of the faults while avoiding creating degenerate quadrilaterals. The procedure for fitting the faults uses geometric criteria, that is criteria based essentially on the closest distance by incrementing as one advances over the nodes belonging to the fault trace. This requires a uniform dispersion of the quadrilaterals neighboring this trace. However, the procedure for generating the regular two-dimensional grid is suitable only for the generation of the meshes of quadrilaterals for geometric maps and it actually complies with the non-degeneracy of the mesh cells. The dispersion is not taken into account at all and the quality of the deformed mesh cells in proximity to the faults is not optimal. This can be illustrated by the case where there are more mesh cells on one side of a trace than on the other. Moreover, after the fitting, the deformation procedure is employed only on the mesh cells neighboring the trace with this optimization being insufficient. Furthermore, in the zones of folds of the regular two-dimensional grid, the mesh cells do not possess a shape which is optimized for the simulations. Thus, the procedure described in this prior art document does not make possible construction of an accurate model, suitable for basin simulation.

SUMMARY OF THE INVENTION

The method according to the invention relates to a method for exploiting a determined subterranean medium on a basis of a meshed representation of the subterranean medium. The mesh quality of the representation of the medium is optimized by a deformation of a two-dimensional grid while minimizing the gradient of displacement of the nodes of the grid. The method according to the invention can be used as a supplement to the procedure described in patent FR 2 948 215 in order to form a more accurate model, suitable for simulations.

The invention relates to a method for exploiting a subterranean medium, in which the subterranean medium is exploited according to an exploitation scheme defined on the basis of a representation of the medium, on the basis of a two-dimensional grid representing the subterranean medium. The quality of the mesh cells of the grid is optimized by displacing the nodes of the grid by a procedure for minimizing the deformation of the grid which comprises:
  (1) generating a reference grid comprising solely regular mesh cells and entirely covering the grid to be optimized;
  (2) imposing a displacement of at least one node, referred to as "a rigid node," of the reference grid i on a corresponding node in the grid to be optimized; and
  (3) constructing an optimized two-dimensional grid by displacement of the other nodes of the reference grid, while minimizing a displacement field of the nodes.

According to the invention, the position of the node corresponding to the rigid node in the grid to be optimized is determined in accordance with geological or geometric considerations.

Advantageously, a rigid node is a node belonging to the boundary of grid to be optimized or a node corresponding to a trace of a fault of the subterranean medium in the grid to be optimized.

Furthermore, the invention relates to a method for exploiting a subterranean medium according to an exploitation scheme defined on a basis of a representation of the medium, the representation of the medium comprising a three-dimensional mesh, the subterranean medium comprising at least one sedimentary layer traversed by at least one fault, the layer being delimited vertically by two geological horizons. For this method, the following steps are carried out:
  a) Constructing a representation of the medium by carrying out the following steps:
  i) discretizing the geological horizons by two triangulated three-dimensional surfaces;
  ii) transforming each triangulated three-dimensional surface into a triangulated two-dimensional surface onto which the fault is projected, by performing an isometric unfolding, the projected fault forming segments describing an open curve;
  iii) generating a regular two-dimensional grid for each triangulated two-dimensional surface;
  iv) optimizing quality of the mesh cells of each regular two-dimensional grid by displacing the nodes of the grid by a procedure minimizing deformation of the grid which comprises the following steps:
    (1) generating a reference grid, comprising solely regular mesh cells which entirely covers the two-dimensional grid;
    (2) optimizing nodes of the reference grid corresponding to rigid nodes of the grid by displacement toward the rigid nodes, with the rigid nodes being the nodes of boundaries of the regular two-dimensional grid;
    (3) constructing an optimized two-dimensional grid by displacement of other nodes of the reference grid, while minimizing a displacement field of the nodes;
  v) deforming each optimized regular two-dimensional grid to fit the nodes of the grid on the curve;
  vi) optimizing the quality of the mesh cells of each deformed two-dimensional grid by displacing the nodes of the grid by minimizing deformation of the grid which comprises the following steps:
    (1) generating a reference grid, comprising solely regular mesh cells which entirely covers the two-dimensional grid;
    (2) displacing nodes of the reference grid corresponding to rigid nodes of the grid to be optimized toward the rigid nodes with the rigid nodes being nodes at boundaries of the regular two-dimensional grid and the nodes of the curve;
    (3) constructing an optimized two-dimensional grid by displacement of other nodes of the reference grid while minimizing a displacement field of the nodes;
  vii) performing a change of the reference frame to transform each deformed optimized grid into a three-dimensional gridded surface, and each quadrilateral which is traversed is transformed into two triangles by a diagonal;
  viii) generating the mesh of the representation of the subterranean medium is generated by creating links between each node of each quadrilateral and of each triangle of the two three-dimensional gridded surfaces, and by cutting each mesh cell which is traversed by the fault of the mesh of the subterranean medium;
  b) simulating at least one exploitation scheme by a representation of the medium and of a flow simulator; and
  c) exploiting the medium by implementing an optimal exploitation scheme.

According to the invention, the procedure for minimizing the deformation of the grid furthermore comprises a final step of testing validity of the mesh and if the mesh is not valid, steps (1) to (3) are repeated.

Advantageously, the validity test detects the folded two-dimensional surfaces of the optimized two-dimensional grid and if folded surfaces are detected, then the displacement field is divided by two while repeating steps (1) to (3).

Preferably, the procedure for minimizing the gradient of the displacement field furthermore comprises a step of converting the grid into a triangular mesh for the steps of displacing the nodes.

According to one embodiment of the invention, the reference grid is generated by carrying out the following steps:
  i) generating a two-dimensional grid composed of rectangles on the grid to be optimized;
  ii) orienting the grid in a direction of the grid is to be optimized; and
  iii) transforming the grid by rotation, by dilation and by translation so that the grid has geometric properties identical to the two-dimensional grid to be optimized.

Preferably, the regular grid is generated by the following steps:
  i) choosing four points on a periphery of the two-dimensional surface which define four curves on the periphery;
  ii) choosing the dimensions of the grid (N, M), and each of the four curves is discretized alternately as a function of the dimensions; and
  iii) the Coons formula is applied to construct the grid.

In an advantageous manner, for step v) before displacing the closest end, a test is carried out to verify that the displacement does not produce a quadrilateral having at least one angle which is greater than a fixed angle threshold and if such is the case, the other end of the edge which is intersected is displaced.

Preferably, the regular grid is transformed into a three-dimensional gridded surface by carrying out the following steps:
  i) for each node not situated on a fault, coordinates of that node are determined with barycentric coordinates of the node in a reference frame defined by a triangle of the 2D triangulated surface to which it belongs;
  ii) for each node situated on a fault, its coordinates are determined with measured curvilinear abscissae on the fault; and
  iii) establishing connectivities between the nodes to maximize a number of quadrilaterals with only quadrilaterals being divided into two triangles for which a fault passes through one of its diagonals.

According to another embodiment, links are created between the nodes by linking each node of each three-dimensional gridded surface having like coordinates i, j, and if a fault intersects this link, a node is linked with the fault by considering a direction of a neighboring node.

The invention also relates to a computer program product downloadable from a communication network and/or recorded on a support readable by computer and/or executable by a processor; the computer program product comprises program code instructions for the implementation of the method such as described above, when the program is executed on a computer.

BRIEF DESCRIPTION OF THE DRAWINGS

Other characteristics and advantages of the method according to the invention will become apparent on reading the description hereinafter of nonlimiting examples of embodiments, while referring to the appended figures described hereinafter.

FIG. 3 illustrates a scale varying from 1 to −0.4, FIG. 3A illustrates a grid before optimization and FIG. 3B illustrates a grid optimized by the method according to the invention.

FIGS. 4 to 7 illustrate the method for generating a mesh of a subterranean medium according to the invention wherein:

FIG. 4 shows a grid of dimension 20×15 and a fault to be fitted;

FIG. 5 shows the same grid after fitting with the fault;

FIG. 6 shows a grid of dimension 25×20 with 7 faults before fitting; and

FIG. 7 shows the same grid after fitting with these 7 faults. The dimension has become 51×33.

FIG. 8 shows a triangulated 3D real horizon;

FIG. 9 shows the same horizon unfolded;

FIG. 10 shows the grid generated on the unfolded horizon and fitted with the faults;

FIG. 11 shows the grid after the mapping as a 3D real horizon;

FIG. 12 shows the hexa-dominant mesh generated by matching two neighboring horizons;

FIGS. 17 and 18 show the solution to the problem hereinabove;

FIGS. 19A to 19D illustrate the steps of generating a two-dimensional grid fitted and optimized according to the invention;

DETAILED DESCRIPTION OF THE INVENTION

The invention relates to a method for exploiting a subterranean medium, in which the subterranean medium is exploited according to an exploitation scheme defined on the basis of a representation of the medium, established on the basis of a two-dimensional grid representing the subterranean medium. The optimization of the quality of the mesh cells of a regular two-dimensional grid representing a subterranean medium is obtained by displacement of the nodes of the grid by a procedure for minimizing the deformation of the grid which comprises the following steps:
  a) generation of a reference grid;
  b) rigid node displacement;
  c) construction of the optimized two-dimensional grid.

The method according to the invention can furthermore comprise a step d), for which a test of validity of the optimized mesh obtained is performed.

The ability of a mesh cell to give coherent results during simulations is called the quality of a mesh cell. A rectangular mesh cell is the type of mesh cell whose quality is highest; conversely a so-called degenerate mesh cell (with small angles) possesses poor quality. This quality can be determined by computing the ratio of the value of the smallest angle of the mesh cell to the value of a right angle (90° or $\frac{\pi}{2}$).

Thus, a rectangular mesh cell will have a quality value of 1.

Step a) generation of a reference grid

Figure 2A:
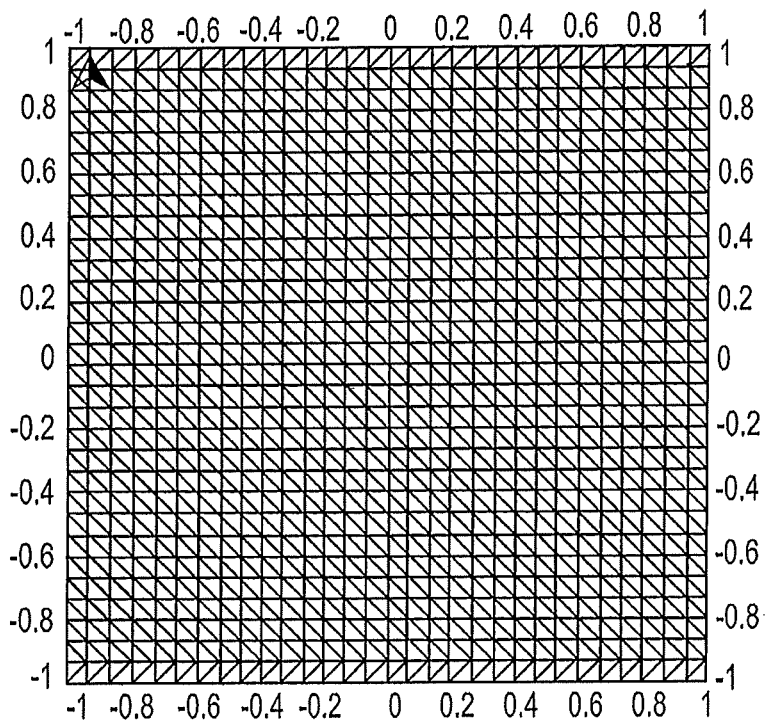
FIGS. 2A and 2B illustrate the optimization method according to the invention.

The goal of the method according to the invention is to obtain a mesh optimized in terms of quality. Accordingly, a two-dimensional grid representing the subterranean medium is deformed by displacing certain nodes of the grid in an imposed manner. The other nodes are displaced as a function of their location in the grid. To obtain this result, a reference grid covering the existing two-dimensional grid is generated initially. This reference grid comprises an equal number of mesh cells to that of the grid to be optimized. Furthermore, the reference grid is formed solely of rectangles and the dimensions of the reference grid are greater than the dimensions of the existing two-dimensional grid. Consequently, the reference grid is of good quality and covers the entirety of the grid to be optimized. FIG. 2A) illustrates such a reference grid.

A plane having two families of perpendicular straight lines delimiting rectangles, preferably squares, is called a grid or a framework (set of principal lines and points of a figure).

In one embodiment of the invention, the reference grid is generated by carrying out the following steps:

i) a grid of rectangles is generated on the two-dimensional grid;

ii) the grid is oriented in the direction of the two-dimensional grid to be optimized, for example by comparing the orientation of the reference grid with the orientation of the two-dimensional grid, and if the orientations are different, that of the reference grid is reversed;

iii) the grid is transformed by rotation, by dilation and by translation in such a way that the grid has the same geometric properties as the regular two-dimensional grid, for example after having estimated an angle of rotation, a dilation parameter and a translation vector between the two grids.

The goal of this process is to reduce the initial displacement field and therefore to improve the accuracy as well as the computation time.

Preferably, the quadrilaterals of the reference grid are transformed into triangles to facilitate the construction of the optimized grid. Here this entails separating each quadrilateral into two triangles by passing through one of their diagonal. The reference grid of FIG. 2A) shows such a cutting.

Step b) displacement of the rigid nodes

For the method for optimizing the mesh according to the invention, the displacement of certain nodes of the reference grid, called rigid nodes, is imposed in accordance with geological or geometric considerations. The rigid nodes can be in particular the nodes of the boundaries of the grid or the nodes corresponding to the traces of faults, whose displacements are known.

These imposed displacements displace the nodes of the reference grid toward the location of the corresponding nodes in the two-dimensional grid. The imposing of the displacement field on the boundaries makes possible retention and compliance with the topology of the surface whose grid is to be optimized. For FIG. 2b), the first row and the last row of nodes of the reference grid have been displaced in an imposed manner respectively toward a semi-circular line that may be the image of a fault.

Step c) construction of the optimized two-dimensional grid

This step deforms the reference grid while minimizing deformation. The minimum deformation makes it possible to preserve the quality of the reference grid while preserving the topology of the grid to be optimized representative of the subterranean medium. The optimized grid is therefore at the same time representative of the medium and of good quality. Indeed, through this deformation, the quality of the reference grid is diffused and distributed to the grid to be optimized. The minimum deformation according to the invention corresponds to the minimization of the gradient of the displacement field of the nodes of the reference grid toward the surface to be optimized.

During this step, all the nodes of the grid whose displacement is not imposed (the non-rigid nodes) are therefore displaced, so as to obtain a good quality mesh representative of the subterranean medium. This optimizes not only the mesh cells close to the boundaries and traces but also all the mesh cells of the grid.

For the preferential embodiment, for which the quadrilaterals have been triangulated, the inverse transformation is operated during this step to obtain quadrilaterals.

Given the points $M=(x,y)$, $M'=(x',y')\in R^2$, a displacement field $\vec{u}=(u_1(dx,y),u_2(x,y))$ from M to M' is defined by the following transformation:

$$\begin{cases} x' = x + u_1(x, y) \\ y' = y + u_2(x, y) \end{cases}.$$

According to the invention, the displacement field $\vec{u}$ is imposed on the nodes of the traces of faults and those of the boundary of the surface. The choice of this displacement field is defined on the basis of the deformation from a reference surface $S_R$ formed by a regular mesh of very good quality to the surface $S_o$ whose mesh is to be optimized. Thereafter, this deformation which is diffused inside the surface is minimized by smoothing all the internal mesh cells. This smoothing must comply with a certain graduation of the initially deformed quantity which is attenuated on moving further away from the neighborhood of the traces of the faults and the boundary.

FIG. 2A illustrates the displacement field in the one-dimensional case. For this example, a displacement of one unit is imposed at the node numbered 0 with the nodes −3 and 3 being fixed. The curve then illustrates the displacement of the intermediate nodes (−2; −1; 1; 2) with the nodes closest to the central node then being subjected to a more sizable displacement.

The embodiment of the computation of the displacement field and of its minimization is detailed as an annex to the description.

Figure 2B:
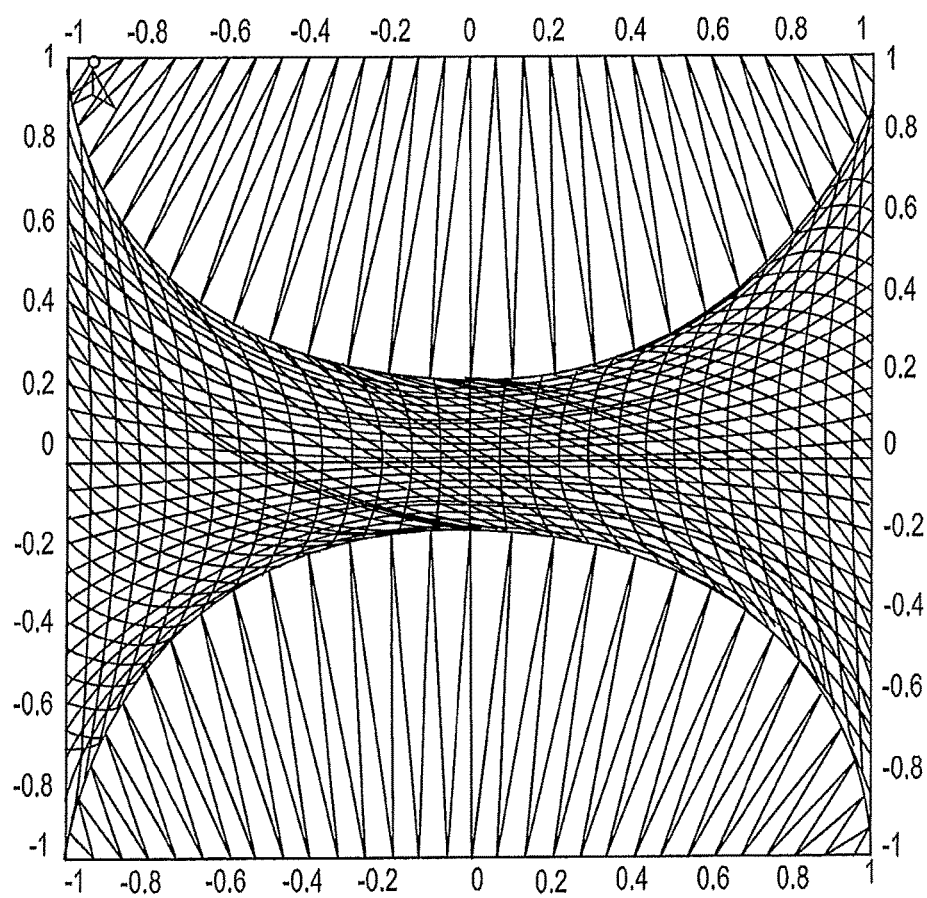

FIG. 2B) illustrates the optimized grid obtained in the extreme case (fault represented by a semi-circular line). It is noted that all the mesh cells of the reference grid have been modified and the mesh cells situated between the two faults are not degenerate. They are substantially rectangular and therefore exhibit good quality.

FIG. 3A) illustrates a two-dimensional grid representing a subterranean medium. Several mesh cells of this grid have been deformed to take faults into account. The quality of the mesh cells is represented in this figure. The darkest mesh cells illustrate the mesh cells of poor quality. It is noted that the mesh cells deformed to take the faults into account are those whose quality is lowest. The quality values used for the legend of FIG. 3 correspond to the computation procedure explained hereinabove which computation of the ratio of the lowest angle to a right angle.

FIG. 3B) illustrates the two-dimensional grid obtained after optimization according to the invention. It is noted that, with respect to the grid before deformation, more mesh cells are deformed and that the quality of the mesh cells is improved.

Step d) test of validity of the mesh

After having deformed the reference grid, it is possible to perform a validity test on the grid. If the grid obtained is not valid, steps a) to c) are repeated. For example, the test can detect the resulting folded surfaces of the optimization method. Indeed, during the step of displacing the nodes, it is possible that folds may be generated in the grid. These folds are not suitable for the simulations and also for the construction of a three-dimensional mesh. If, by this test, folds are detected, then steps a) to c) are repeated while dividing the displacement field by two.

The invention also relates to a method for exploiting a subterranean medium according to an exploitation scheme defined on the basis of a representation of said medium. The representation of the medium comprises a three-dimensional mesh. The subterranean medium comprises at least one sedimentary layer traversed by at least one fault with the layer being delimited vertically by two geological horizons. According to the invention, the mesh of the representation of the subterranean medium is generated by carrying out the following steps:

a) the geological horizons are discretized;
b) each triangulated three-dimensional surface is transformed into a triangulated two-dimensional surface onto which the fault is projected by an isometric unfolding with the projected fault forming segments describing an open curve;
c) a regular two-dimensional grid is generated for each triangulated two-dimensional surface;
d) the quality of the mesh cells of each regular two-dimensional grid is optimized;
e) each optimized regular two-dimensional grid is deformed to fit the nodes of the grid on the curve;
f) the quality of the mesh cells of each deformed two-dimensional grid is optimized;
g) a change of reference frame is performed to transform each deformed optimized grid into a three-dimensional gridded surface and each quadrilateral traversed by the fault is transformed into two triangles at the level of a diagonal; and
h) the mesh of the subterranean medium is generated by creating links between each node of each quadrilateral and of each triangle of the two three-dimensional gridded surfaces, and by cutting each mesh cell, traversed by the fault, of the mesh of the subterranean medium.

Steps a), b), c), e), g) and h) are known, in particular from patent document FR 2,948,215. Consequently for these steps, only the essential characteristics will be discussed.

Step a) discretization of the geological horizons

During this step, the two geological horizons delimiting each sedimentary layer are discretized by two triangulated three-dimensional surfaces.

Step b) transformation into triangulated two-dimensional surface

This step unfolds in an isometric manner the triangulated 3D surfaces to obtain a triangulated 2D surface and makes possible stitching together the tears in the faults present on the triangulated 3D surfaces.

A transformation of a 3D surface into a 2D surface (an operation which flattens out a surface) is called "unfolding". This transformation is "isometric" when it preserves measures, such as the lengths of edges, and therefore surfaces, such as the areas of triangles.

Tools and procedures are known for carrying out an isometric unfolding of a surface. The method according to the invention does not depend on the type of unfolding procedure.

Figure 8:
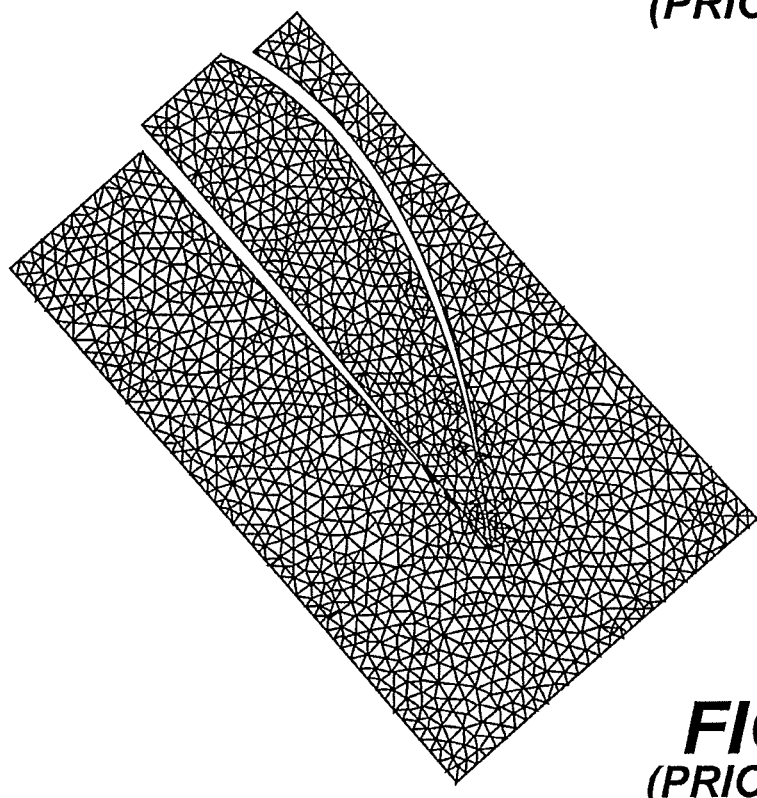
FIGS. 8 to 12 show the sequence of stages of the meshing according to the method of the present invention, by application to an example.
Figure 9:
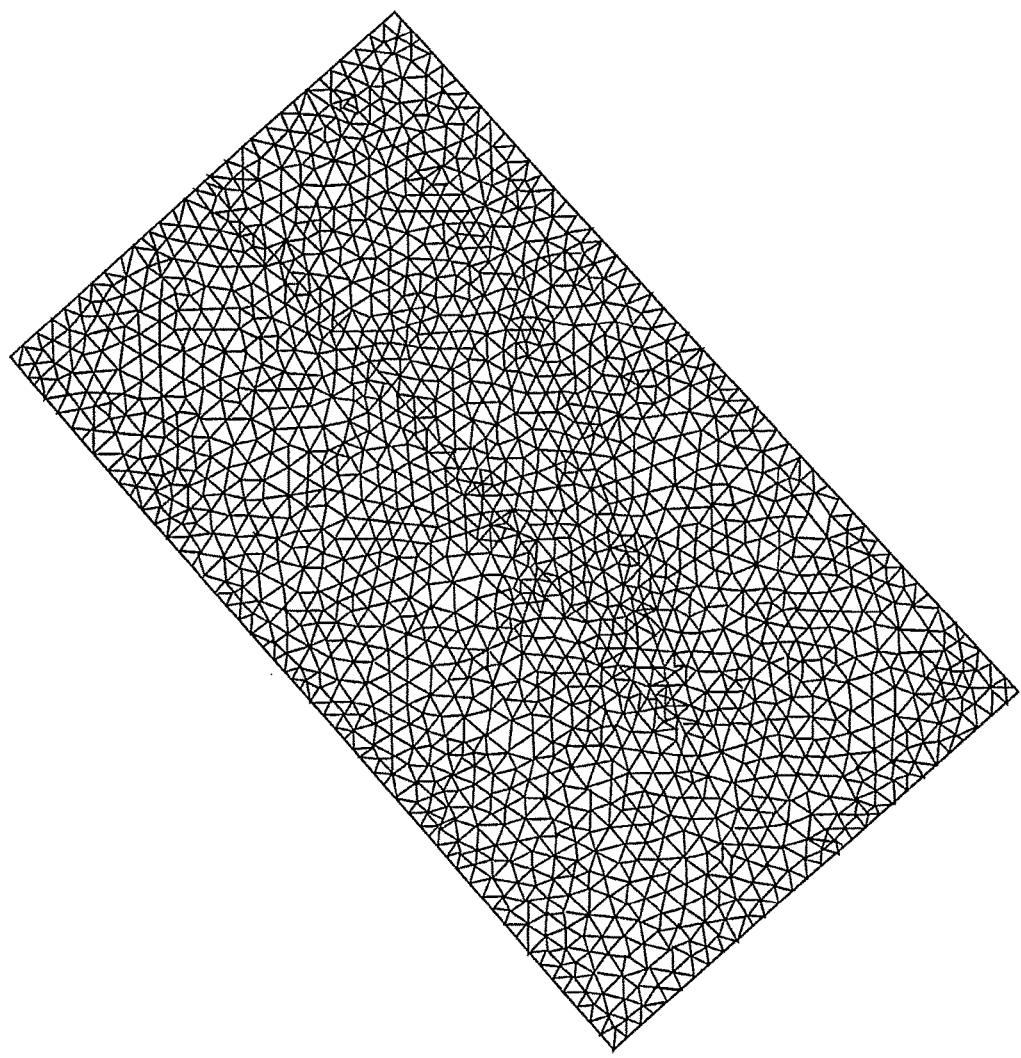

FIG. 8 illustrates an example of a triangulated three-dimensional real horizon and FIG. 9 shows the same horizon unfolded.

Step c) generation of a regular two-dimensional grid

This step generates a regular 2D grid, on the basis of the periphery of the triangulated 2D surface.

This regular grid is generated by the following steps:

Four points are chosen on the periphery of the triangulated 2D surface to define four curves on the periphery, called boundary curves, linking these four points.

These four points are preferably those at the level of which the periphery forms the smallest angles. They are called "corners".

The dimensions of the grid are chosen (two integers denoted N and M), and each of the four curves is discretized alternately as a function of these dimensions.

For all the grids, a corner is matched and the boundary curves are oriented in such a way that the domain is situated on the left. Here domain is a mathematical term meaning the geometric shape that it is desired to mesh. This step serves to orient all the horizons in the same manner to facilitate the final step which is the matching of the horizons. Next, the boundary curves are subdivided into N or M segments of constant length with N and M being the same as the grid beneath.

The Coons formula is applied to the discretized version to construct the regular grid underpinned by the unfolded horizon (triangulated 2D surface). The Coons formula is:

Given four parametric curves f1(u), f2(u), g1(v), g2(v) (0≤u, v≤1) defining four connected boundaries, the Coons formula computes the tightest surface which passes through the four boundaries (which interpolates these boundaries):

$$S(u, v) = (1 - u)g1(v) + ug2(v) + (1 - v)f1(u) + vf2(u) -$$
$$[(1 - u)(1 - v)P(0, 0) + ((1 - u)vP(0, 1) + u(1 - v)P(1, 0) + uvP(1, 1)]$$

The vertices P(i,j) are the four corners of the surface.

It is then possible to obtain a regular mesh N×M of this surface by simple sampling, taking as vertices the points S(i,j) corresponding to the ui=i/(N−1), vj=j/(M−1), i=0 to N−1, j=0 to M−1. The formula restricted to the points of the mesh becomes:

$$S(i, j) = \left(1 - \frac{i}{N-1}\right)g1(j) + \frac{i}{N-1}g2(j) + \left(1 - \frac{j}{M-1}\right)f1(i) +$$
$$\frac{j}{M-1}f2(i) - \left[\left(1 - \frac{i}{N-1}\right)\left(1 - \frac{j}{M-1}\right)P(0, 0) + \left(1 - \frac{i}{N-1}\right)\frac{j}{M-1}\right.$$
$$\left.P(0, 1) + \frac{i}{N-1}\left(1 - \frac{j}{M-1}\right)P(1, 0) + \frac{i}{N-1}\frac{j}{M-1}P(1, 1)\right]$$

Figure 4:
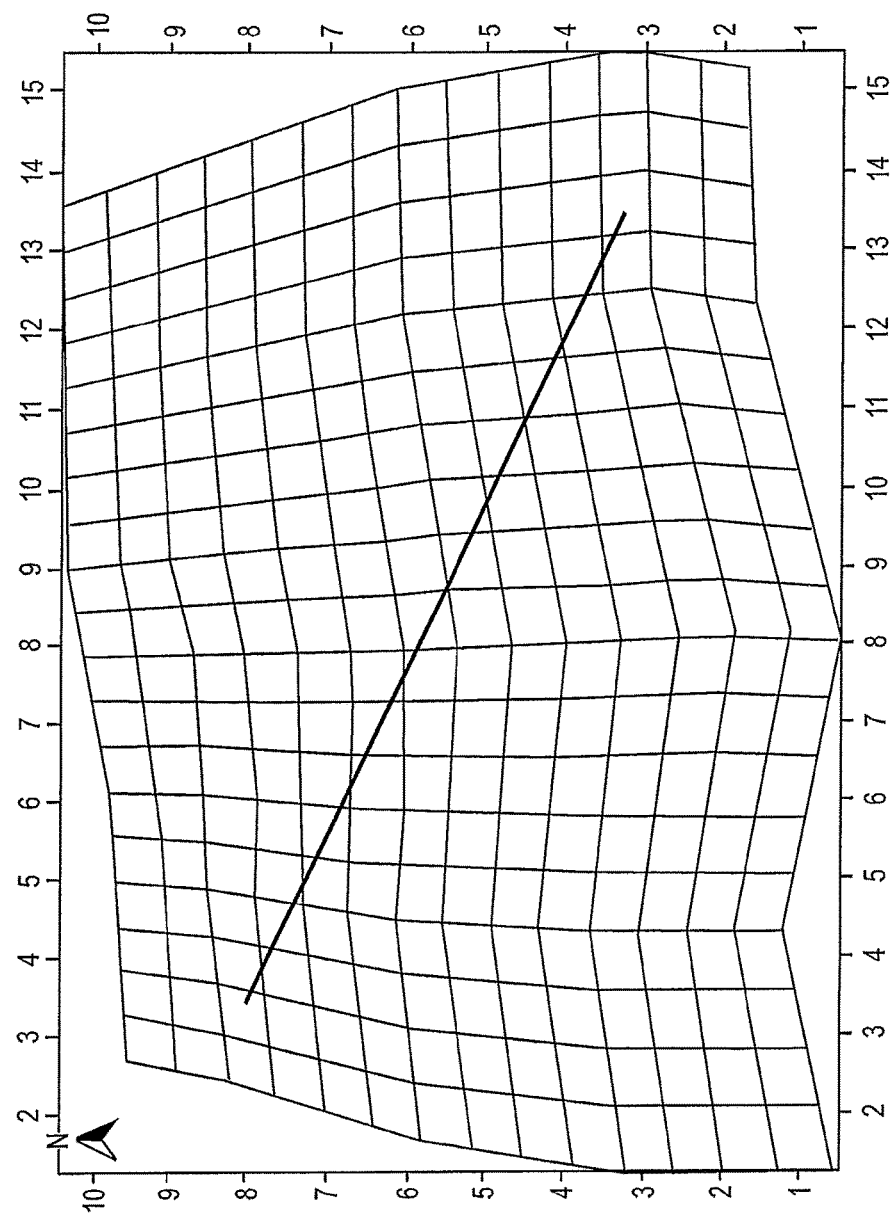

FIGS. 4, 6, 9 and 19A) illustrate regular two-dimensional grids according to the invention. In FIG. 4, a fault has been represented, whereas in FIG. 6 several faults are represented. FIG. 19A) represents, for its part, the quality of the mesh cells of the grid. An extended zone of mesh cells of low quality is noted.

Step d) optimization of the quality of the mesh cells

With the grid optimization steps described hereinabove, a two-dimensional grid is generated and optimized in terms of quality of the mesh. For the application of the grid optimization steps described above, the rigid nodes correspond to the nodes of the boundaries of the grid to be optimized. The displacement of these rigid nodes is therefore imposed on the nodes of the boundaries of the grid to be optimized.

FIG. 19B) illustrates an optimized two-dimensional grid according to the example of FIG. 19A). In this figure, it is noted that the zone of mesh cells of low quality is reduced with respect to the previous step.

Step e) fitting of the faults

Taking a fault into account is by deforming the mesh in such a way that it conforms with the reality of the subterranean medium to be meshed. Indeed, if a fault passes through a medium, generally the sedimentary layers of this medium are broken and deformed. The mesh must therefore account for these deformations induced by the faults.

Case of a single fault

In the course of this step, the fault is taken into account within the regular grid, by carrying out the following steps:

A first grid edge intersected by the open curve is determined by traversing this curve segment by segment starting from one of its ends; and the end of the intersected edge closest to the point of intersection is displaced toward the point of intersection.

Figure 1:
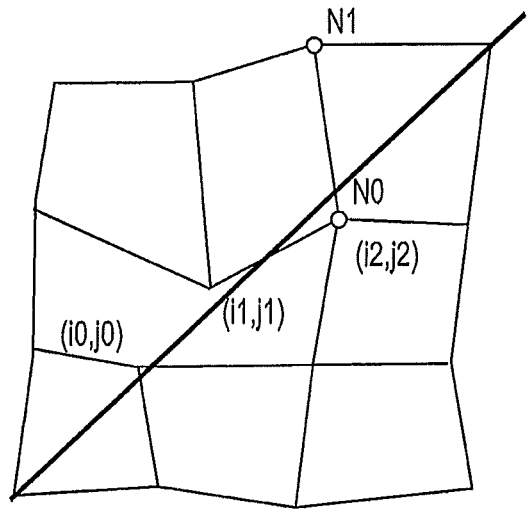
FIG. 1, already described, illustrates a two-dimensional grid with degenerate quadrilaterals.

A difficulty may arise due to the fact that degenerate quadrilaterals might be produced by moving this end. This problem is illustrated in FIG. 1:

Consider three nodes such as:

(i2, j2) the node to be moved (i1, j1) the node moved just before (i2, j2)

(i0, j0) the node moved just before (i1, j1)

If (i0=i1 or j0=j1) then (i0, j0) and (i1, j1) form an edge (two nodes moved successively form either a diagonal, or an edge of a quadrilateral). Likewise, (i1, j1) and (i2, j2) form a second edge if (i1=i2 or j1=j2). Consequently, these two constructed edges will be in the same quadrilateral if |i0−i2|=1 and |j0−j2|=1 and will be considered to be aligned if the angle between them exceeds a certain alignment threshold. This situation is not acceptable since the hexahedrons having this quadrilateral as a face will be twisted. To surmount this difficulty, before displacing the closest end, a check is carried out to verify that this displacement does not give rise to a degenerate quadrilateral. A quadrilateral is called degenerate if at least one of its angles is greater than a fixed angle threshold (if an angle of the quadrilateral is above this threshold, this signifies that another angle of this quadrilateral will be small and consequently the value of the quality will be low). If, in actual fact, displacing the closest end gives rise to such a quadrilateral, then the other end of the intersected edge is displaced. According to the example of FIG. 1, the other end of the edge intersected by the fault is moved instead of (i2, j2).

The procedure is implemented by a computer and the algorithm relating to this step is described. The algorithm commences with the identification of the quadrilateral which contains the first point of the fault. Next, the intersection between the first segment of the fault and the edges of this quadrilateral is computed. If no intersection is detected, the algorithm proceeds to the next segment of the fault and loops until an intersection is found. Thereafter, the end of the intersected edge closest to the point of intersection is moved toward the latter. If this results in the formation of a degenerate quadrilateral, it is the other end of the edge which is moved. To compute the next intersection, the algorithm advances along the quadrilaterals having the last node paired in common and excludes those which have the last two nodes paired like a diagonal or an edge. If there is no longer any intersection between the current segment and the quadrilaterals to be visited, the quadrilaterals to be visited are reassigned with that which contains the extremity of the current segment, and the algorithm proceeds to the next segment to compute the intersection, and so on and so forth. On completion, the two extremities of the fault are fitted with the closest nodes.

Case of multiple faults

In the presence of multiple faults, not all the nodes of the grid are free to move, since a node which has already been displaced to account for a first fault must not be modified to account for a second fault. The fitting algorithm must therefore account for this new more constraining context, and a refinement procedure can be performed to free oneself from this constraint.

According to the invention, multiple faults are taken into account within the regular grid, by carrying out the following steps:

a first edge, intersected by the open line, of the grid is determined by traversing the line segment by segment starting from one end of the open line;

the end of the edge closest to the point of intersection is displaced toward the point of intersection if this displacement does not give rise to a quadrilateral which has at least one angle greater than a fixed angle threshold, and if this end has not already been displaced; otherwise the other end is displaced toward the point of intersection if this end has not already been displaced; otherwise the mesh is refined, until an end can be displaced, and this end is displaced.

The refinement of the mesh can be carried out by the following steps:

A new node is added to the mesh, corresponding to a point of intersection between a fault and the edge for which no end can be displaced;

if the edge is vertical, the complete line of the grid containing the point of intersection is split by adding a succession of horizontal edges, in all the quadrilaterals of the line, the succession of edges passing through the point of intersection;

if the edge is horizontal, the complete column of the grid containing the point of intersection is split by adding a succession of vertical edges, in all the quadrilaterals of the column, the succession of edges passing through the point of intersection.

This refinement is also applied to all the horizons situated lower down, if the horizons are processed from the lowest to the highest.

The procedure is implemented by a computer with the algorithm relating to this step being described as follows. To describe whether a node is constrained by one or more faults, two notions are introduced: the first termed "Faulted degree of a node" and the second termed "Passing faults of a node".

Faulted Degree of a Node (Fd):

A node S is said to be of faulted degree n if it is the point of intersection of n faults. If n is zero, then no fault passes through this node. The faulted degrees of the nodes are stored as a property of the grid, and are useful for the phase of taking the faults into account, to verify whether a node is constrained by faults, for the grid optimization phase (fd=0: move the node freely; fd=1: project onto the passing fault; fd>=2: do not move), and finally for the grid 3D mapping phase, so as to decide when and how a node is split.

Passing Faults of a Node:

This is the list of faults which pass through a node.

The global process of fitting the multiple faults is iterated from bottom to top on all the horizons, to generate regular grids and fit the faults thereto. For each horizon, a grid of the same dimension as those situated lower down (geologically older) are generated first, and then all the points of intersection between the faults and the ends of the faults are fitted. The global process iterates over all the faults to account for them in the mesh. When a refinement is necessary on a grid of a horizon to pair a fault, the grids of the horizons already processed undergo the same refinement in an exhaustive manner, to retain a single dimension for all the grids.

Concerning the structures of the data, having regard to the fact that the number of the nodes of a grid on a horizon may increase subsequent to a refinement, a chained list is used to represent the grid, to facilitate the addition of a new node at an arbitrary position. Hence, the nodes traversed by a fault are recorded in a linked list to allow fast insertion.

To fit a given fault, a segment-by-segment search is conducted for the points of intersection between the fault and the grid, and the nodes to be moved to these points of intersection are decided. A point of intersection is computed in the following manner. The first node in the list of nodes traversed by a fault which represents the start of the first segment of the fault is the beginning, the four neighboring cells of this node are recovered, and a search is conducted for the intersection of the first segment with these four cells. If an intersection is found, an end of the intersected edge is chosen and it is moved to the point of intersection. The neighboring cells of the node representing this intersection become the cells to be visited to compute the next intersection with the same fault segment, with the exclusion of those which have the new paired node and the one before as edge or diagonal. If there is no longer any intersection between the current segment and the cells to be visited, the cells to be visited are reassigned with that which contains the extremity of the current segment, and the next segment is processed to compute the intersection, and so on and so forth.

While scanning across the fault, already paired points may be encountered, which represent for example the intersections of the fault with other faults present on the same horizon. It is therefore necessary to verify, for the last paired node, whether there exists a previous node in the list of nodes traversed by a fault. If so, if the two nodes form an edge or a diagonal of a quadrilateral, the previous node becomes the current node for computing the cells to be visited, and computation proceeds to the fault segment which corresponds to this node to continue the intersection computation.

Thereafter, the refinement process can be triggered by the addition as a new node of a point of intersection between a fault and a grid.

Figure 5:
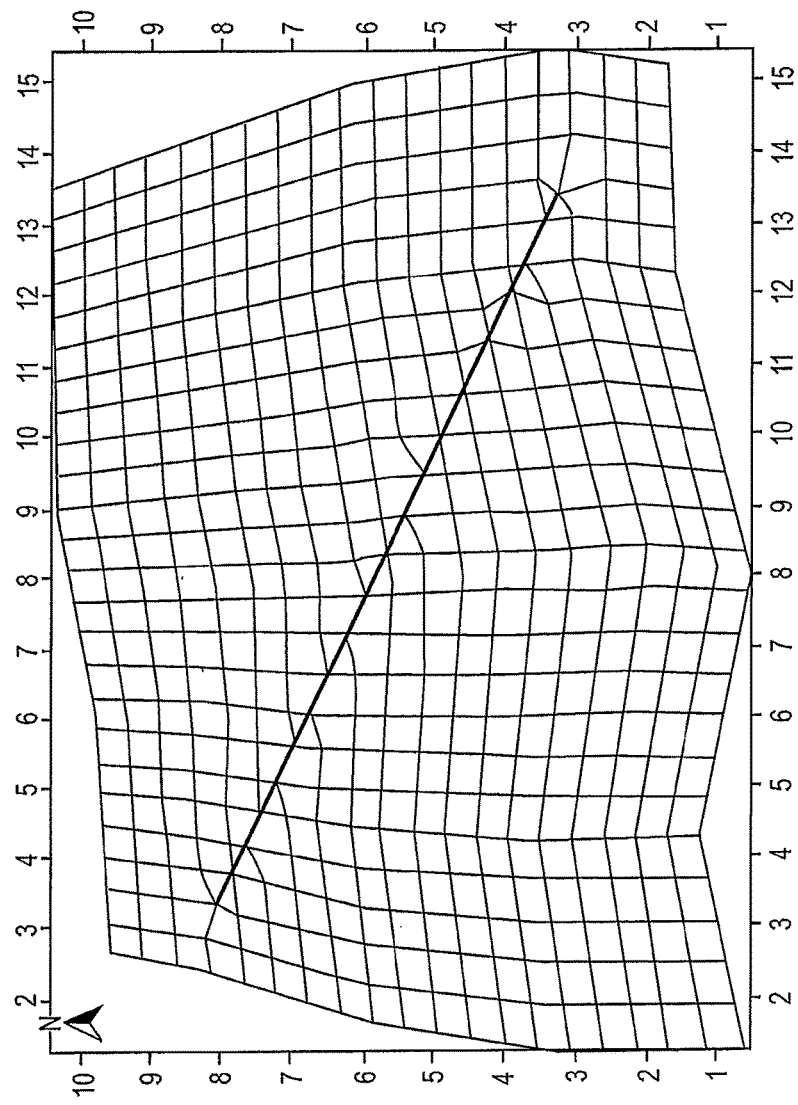
Figure 6:
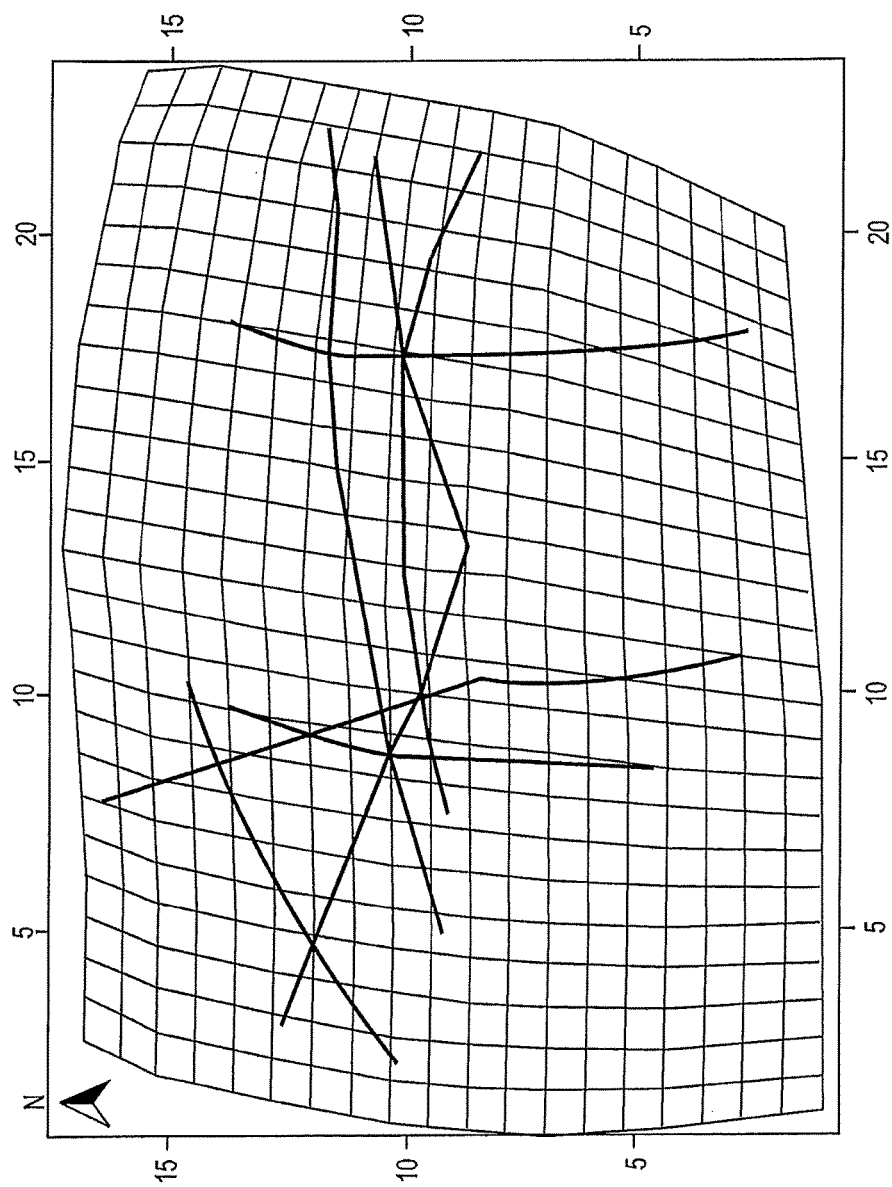
Figure 7:
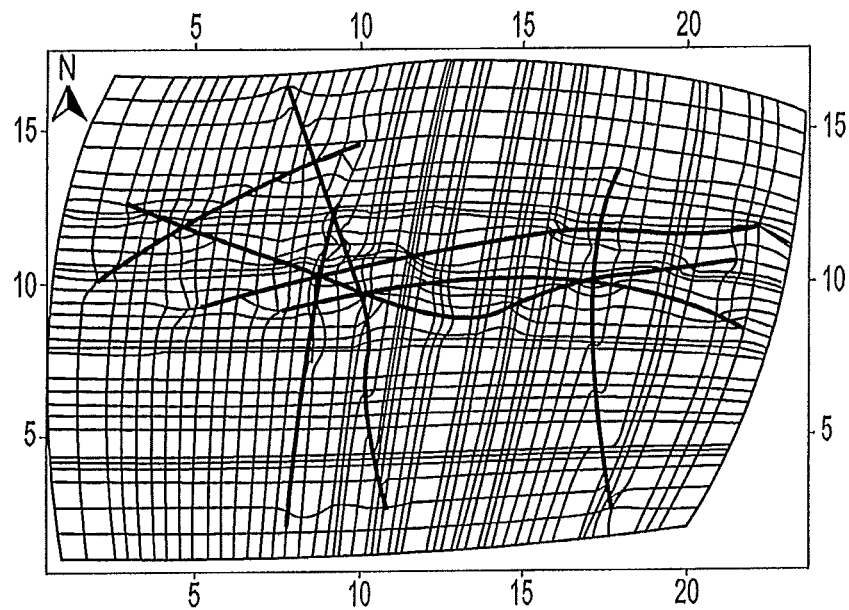
Figure 10:
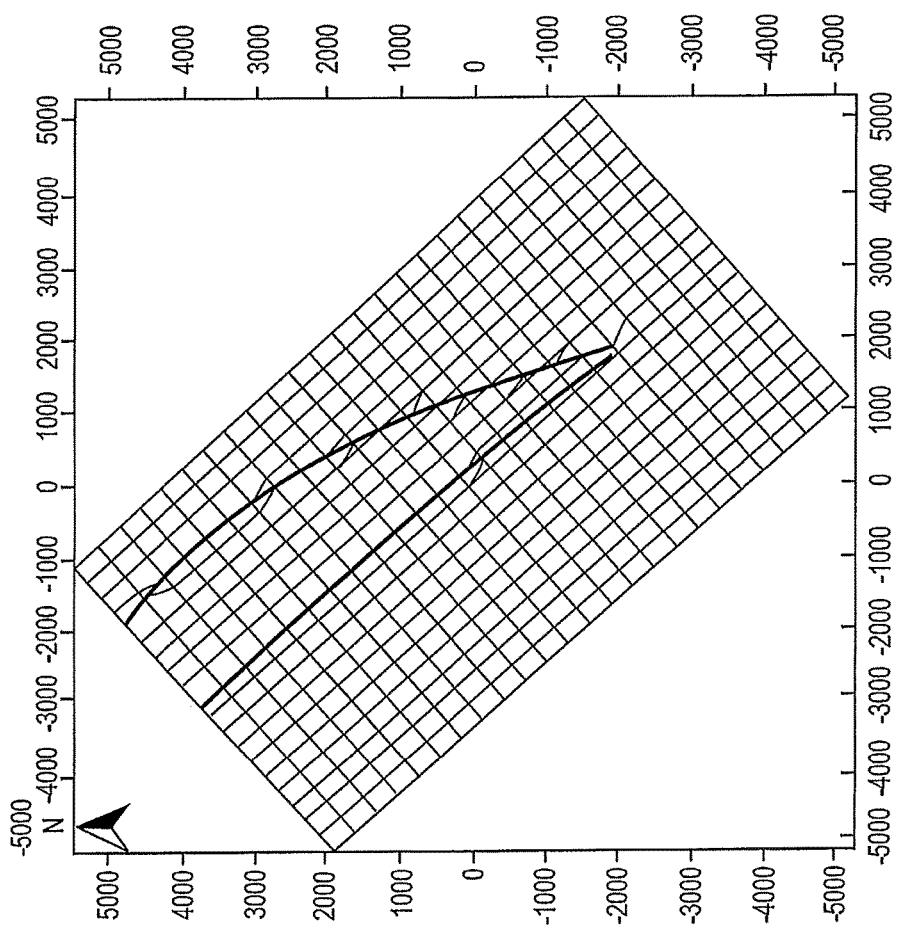
Figure 19C:
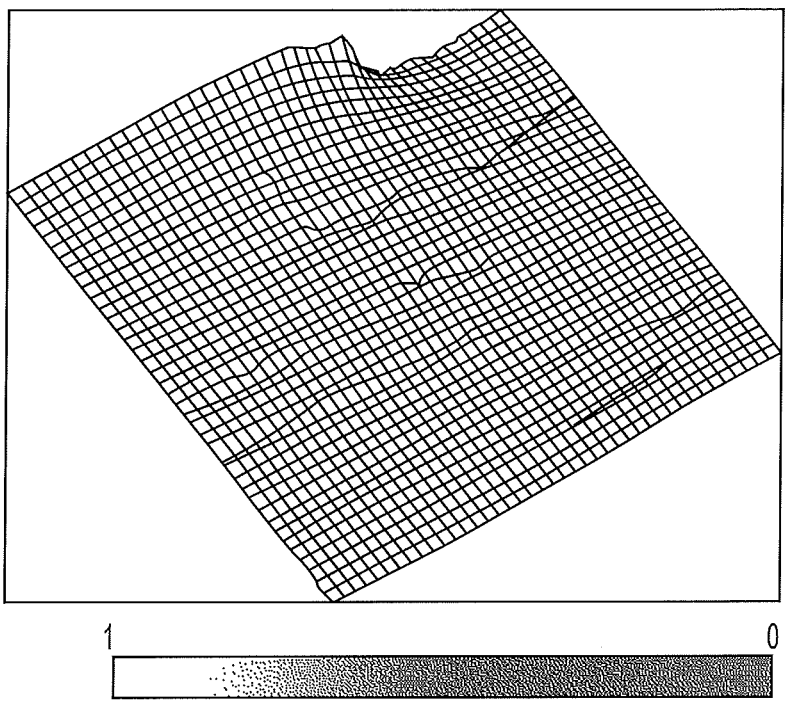

FIGS. 5, 7, 10 and 19C) show grids after accounting for faults according to the examples of FIGS. 4, 6, 8 and 19A). In FIG. 5 with a single fault, it is noted that only the mesh cells neighboring the fault are deformed. In FIG. 7 with several faults, and for which a refinement procedure has been used, the arrangement of numerous mesh cells is modified and new mesh cells are created by the refinement procedure. FIG. 10 illustrates the fitting of the faults for the example of FIG. 8. In FIG. 19C), it is noted that the fitting of the faults gives rise to a certain number of mesh cells of low quality in proximity to the faults.

Step f) optimization of the quality of mesh cells

With the aid of the grid optimization steps described hereinabove, a two-dimensional grid is generated and optimized in terms of quality of the mesh. For the application of these grid optimization steps, the rigid nodes correspond to the nodes of the boundaries of the grid to be optimized and to the nodes on the traces of the faults of the grid to be optimized. The displacement of these rigid nodes is therefore imposed on the nodes of the boundaries and the nodes of the traces of faults of the grid to be optimized.

Figure 19D:
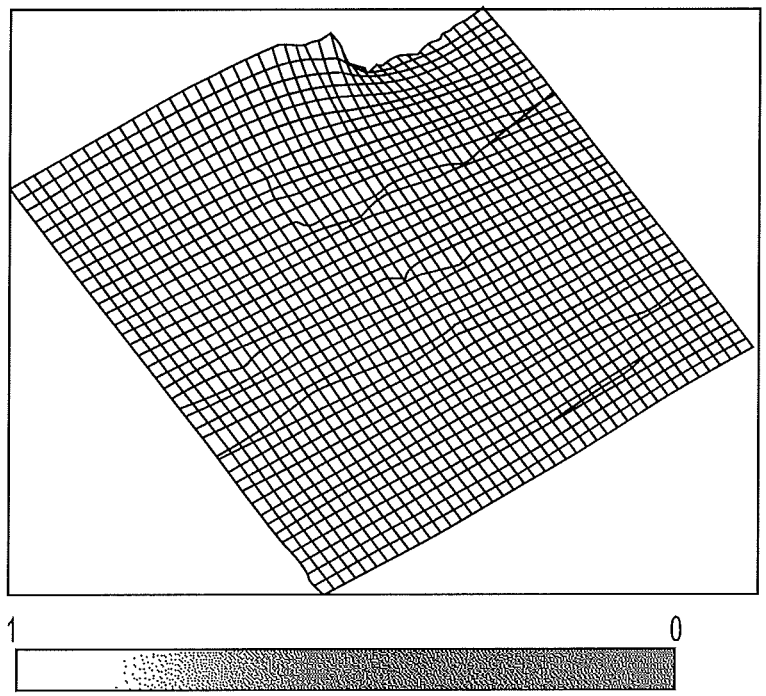

FIG. 19D) illustrates an optimized two-dimensional grid according to the example of FIG. 19A). In this figure, it is noted that the zone of mesh cells of low quality is reduced with respect to the previous step.

Step g) transformation into three-dimensional gridded surface

This step maps the regular grid, which is deformed to account for the faults and optimized, into a 3D real horizon.

According to the invention, it is possible to transform the regular grid into a three-dimensional gridded surface by performing a change of reference frame, from the reference frame of the regular grid to the reference frame of the triangulated 3D surface, of the nodes of the grid. The coordinates of the off-fault nodes are determined on the basis of their barycentric coordinates in a reference frame defined by the triangle of the 2D triangulated surface to which they belong. The coordinates of the nodes situated on a fault are determined on the basis of their curvilinear abscissae on the fault. The connectivities are thereafter established to maximize the number of quadrilaterals with only the quadrilaterals for which a fault passes through one of its diagonals being divided into two triangles.

Figure 11:
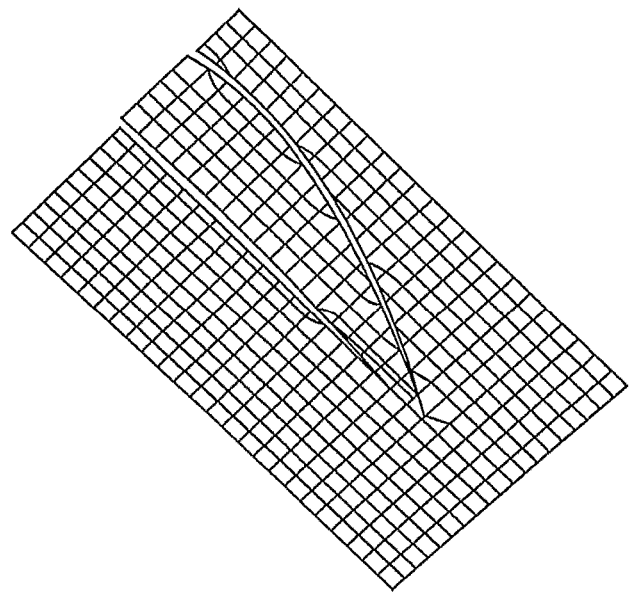

In particular it is possible to carry out the following steps:
the nodes are positioned in the 3D reference frame:
for each node of the grid situated on a fault, the curvilinear abscissa of the node on the fault is determined, and then this node is mapped onto the fault in the 3D reference frame by use of the curvilinear abscissa, and this node is split on each side of the lip of the fault if necessary;
for each node of the grid situated outside a fault, the barycentric coordinates of each node of the grid are determined in a reference frame defined by the triangle of the 2D triangulated surface to which the node belongs, and then each node is positioned in a reference frame defined by the triangle of the 3D triangulated surface to which the node belongs, as a function of the barycentric coordinates;
these nodes are connected by edges to obtain a meshed 3D surface with a maximum of quadrilateral; only the quadrilateral and for which a fault passes through one of its diagonals are divided into two triangles, as illustrated by FIG. 11 (for the example of FIG. 8).

Figure 13:
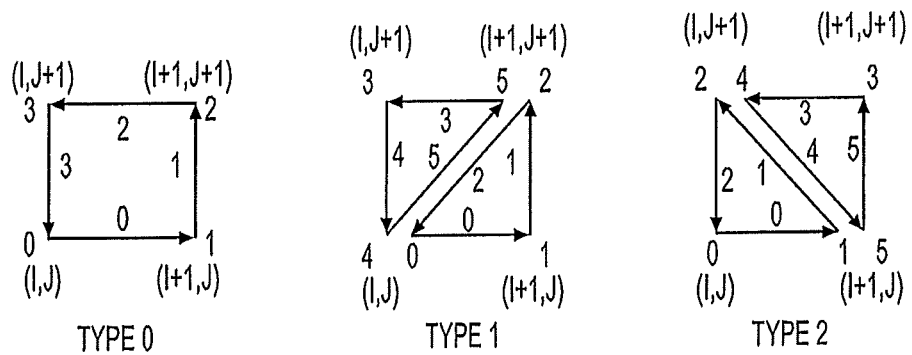
FIG. 13 shows the three types of elements of a grid mapped as a 3D horizon.

This procedure is implemented by a computer with the algorithm relating to this procedure is described as follows. The principal structure represents a quasi-regular 3D grid, with certain nodes (I, J) split into two or more. FIG. 13 shows three types of pseudo-quadrilateral cells which are a normal quadrilateral, a quadrilateral split into two triangles by the diagonal going from bottom left to top right and a quadrilateral split into two triangles by the diagonal going from bottom right to top left. The local numbering of the nodes and edges of the quadrilateral is also indicated in the scheme. With this notion of the pseudo-quadrilateral cells, the grid mapped into a 3D real horizon remains a surface IJ.

The principal structure is described by:
nx and ny are a number of columns and lines
nodes are a list of nodes (I, J);
cells are a list of cells
For a node (I, J), the following information is stored:
number of nodes that are split
containing triangle and the barycentric coordinates in the triangle, if the node is not split;
for each split node a fault number, reference on the side of the fault, number of the segment of the fault and curvilinear abscissa of the node on this segment. When the node represents an intersection between faults, the stored information is the number of the node in the triangulation, the reference on the side of one fault and the other reference on the side of the other fault;

for each split node: coordinates x, y, z

For a pseudo-quadrilateral cell, the following information is stored:
   type of the cell
   number of vertices
   table of vertices The algorithm commences by scanning through the nodes of the 2D regular grid paired with the faults. For each node (I, J), the passing faults are first recovered. If there are no passing faults, a triangle containing the node in the unfolded triangulation is located, and the corresponding node on the 3D real horizon is computed using the barycentric coordinates of the triangle of the same number on the 3D original triangulation. If the node (I, J) is situated on a single fault, the segment is first recovered for the fault where this node is situated in unfolded space. The curvilinear abscissa of the node on this segment is thereafter computed. Next, the two corresponding split nodes are computed using this curvilinear abscissa on the same segment on two sides of the fault in real space. For a node situated at the intersection of the faults, its number in the triangulation is recovered and the references on the sides of faults which intersect thereat are recorded.

Apart from the coordinates, the information relating to the faults or the containing triangle is stored to facilitate the generation of the volume mesh by matching the horizons.

Once the nodes of the unfolded grid have been mapped into a real horizon, the connectivity between these nodes is established by forming pseudo-quadrilateral cells. These cells are constructed one by one by scanning first the direction I and then J. The type of the current cell is first determined. To do this, it is necessary just to verify whether there is a passing fault on one of two diagonals of the quadrilateral in the unfolded grid. If so, the type is 1 or 2; otherwise, the type is 0. The number of vertices for the current cell is then obtained as a function of its type, as well as the index (I, J) of each vertex. With this index, a test is carried out to verify whether a vertex is or is not split, by examining the list of nodes (I, J) which have been previously filled. If all the vertices are split, the current cell is added to a temporary list, which saves the cells with all its split vertices for processing at the end, and processing passes to the next cell. Otherwise, the non-split node IJ is immediately mapped, since there is a single corresponding 3D node. For each already mapped node of the current cell, the adjacent and opposite nodes split in the cell are computed in the following manner: If the non-split node and the adjacent one is on the same fault, the node on the same side of the fault is chosen; otherwise, the hundredth point on the edge of the non-split node and the adjacent one is taken. It is located in the unfolded triangulation, and it is mapped into a real triangulation by using the same triangle and the same barycentric coordinates. The distance is thereafter computed between the mapped point and all the split nodes of the adjacent node IJ. The closest node is chosen as the corresponding vertex of the current cell. For the node opposite the current node (already mapped) of the diagonal, the split node on the other side of the fault is chosen. This procedure loops back until all the vertices are mapped.

For a cell with all its vertices split, for each of its edges, the facing edge in the neighboring cell is tagged, the reference of the fault where this facing edge is situated is recovered, and the current edge is therefore on the other side of the fault with a different reference. The corresponding split nodes are thus determined according to this reference. FIG. 11 shows the grid of FIG. 10, mapped into a 3D real horizon.

Step h) generation of the mesh of the subterranean medium

Figure 14:
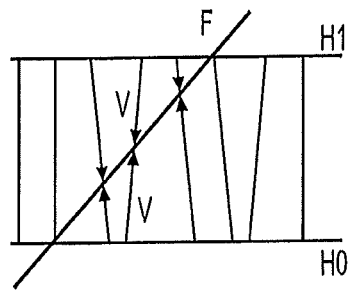
FIG. 14 shows the principle of the matching of two horizons.

Steps a) to f) are carried out on each horizon while preserving the same number of quadrilateral for each horizon. It is therefore possible to reconstruct a three-dimensional mesh between the various horizons. This step constructs a three-dimensional mesh of the medium, by directly linking the nodes having the same coordinates I, J on two neighboring horizons to form three-dimensional mesh cells, and in optionally cutting these mesh cells if they are traversed by the fault. If a fault intersects this link, then a node is linked with the fault by considering a direction of a neighboring node. This is illustrated in FIG. 14.

Figure 15:
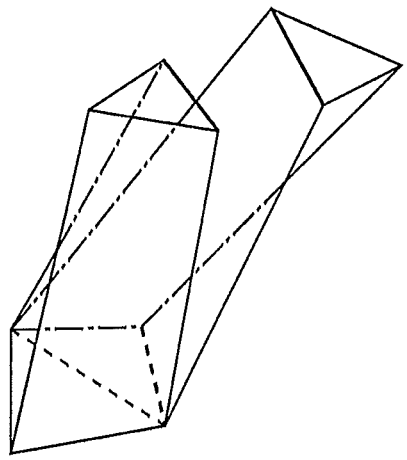
FIGS. 15 and 16 show the problem of the matching of two horizons in a faulted zone.

When a quadrilateral on one of two horizons is split into two triangles via a fault which passes through the diagonal, the corresponding quadrilateral on the other horizon is also cut virtually in the same manner and two prisms will be formed. Nevertheless, one of the two prisms is twisted and the interface of the fault is not complied with. In FIG. 15, the segments drawn in bold are on the same fault surface. It is seen that the quadrilateral at the bottom left of the fault rejoins two triangles at the top left and right of the fault.

Figure 16:
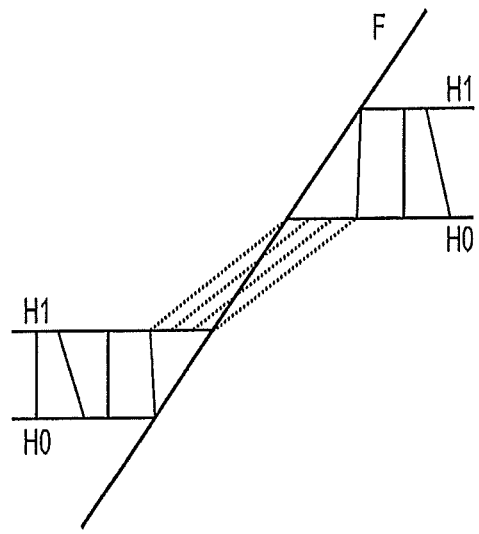

A problematic configuration is produced when the horizons on the two sides of the fault slip on the latter, as illustrated by FIG. 16: elements are incorrectly constructed outside of the layer formed between the horizons H0 and H1 by linking the same i and j.

The malformation of the elements corresponding to the two configurations hereinabove is due to an incorrect choice of the direction of tying between two horizons. The solution thus resides in the detection and the correction of wrong directions. To detect the presence of a wrong direction during the creation of a 3D element, a test is first carried out to verify whether there exists a segment linking the same I, J which passes through a fault. If so, the 3D element actually comprises directions to be corrected and it must be replaced with two 3D elements which follow the corrected directions. Otherwise, a test is carried out to verify whether there exists a fault which passes through two edges of the 3D element, one on the horizon at the top and another on that at the bottom. If so and if the local indices of these two edges are different, the element also has to be corrected. Let E be the 3D element in question, F be the traversing fault, E1 and E2 be the two 3D elements to be created to replace E. The correct directions are computed in the following manner:
   all the nodes of E in H0 are first scanned to find the nodes on a fault F. Let P0 be such a node. There therefore exists another node having the same IJ which is situated on the other side of this fault in H0, i.e. P0'. Let P1 be the node in H1 tied to P0 in E. Instead of tying P0 to P1, P0' is tied to P1, P0 to itself and P0'P1 is associated with E1, P0 with E2. E2 is reduced to a tetrahedron (if E is a prism) or a prism (if E is a hexahedron). P0'P1 is recorded as a correct direction of E1. This procedure is repeated on H1 to retrieve correct directions of E2.
   if there is no node on the fault F in H0, a search is conducted for a neighboring 3D element of E through a node of E in H0. Let E' be the neighboring 3D element chosen, P2 be the node in common, and P2' be the node in H1 linked to P2 in E'. P2 is linked to P2' in E2 and P2P2' is recorded as a correct direction of E2. Likewise, the correct direction of E1 is computed when no node in fault F is situated in H1.

Figure 17:
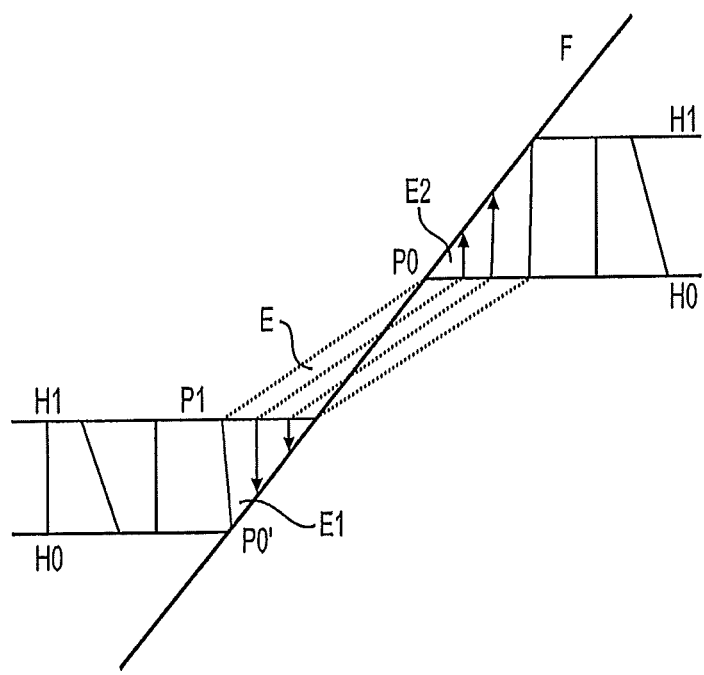

By following the corrected directions in E2, all the as yet unprocessed nodes in H0 are projected onto the fault surface and are tied to its corresponding images. All the unprocessed nodes in H1 are projected onto the fault surface following the corrected directions in E1, as illustrated by FIGS. 17 and 18.

Figure 12:
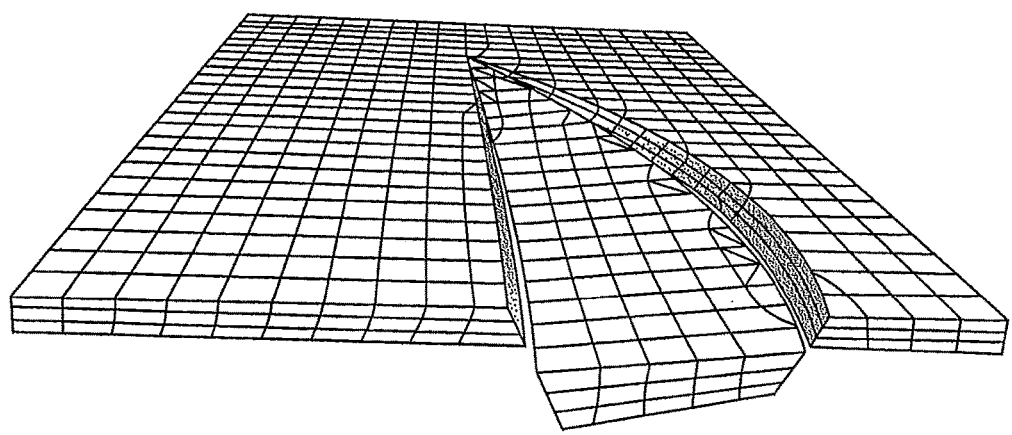

FIG. 12 illustrates the final result of a matching on the basis of the grid of FIG. 11.

Figure 20A:
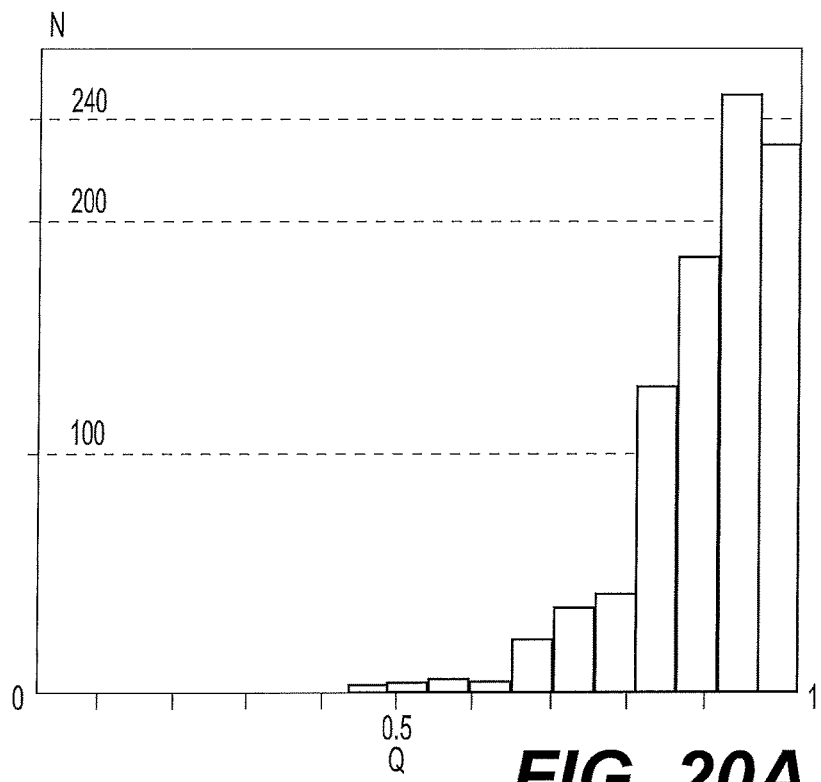
FIGS. 20A and 20B are histograms representing the distribution of the mesh cells as a function of their qualities, respectively according to the invention and according to the prior art.
Figure 20B:
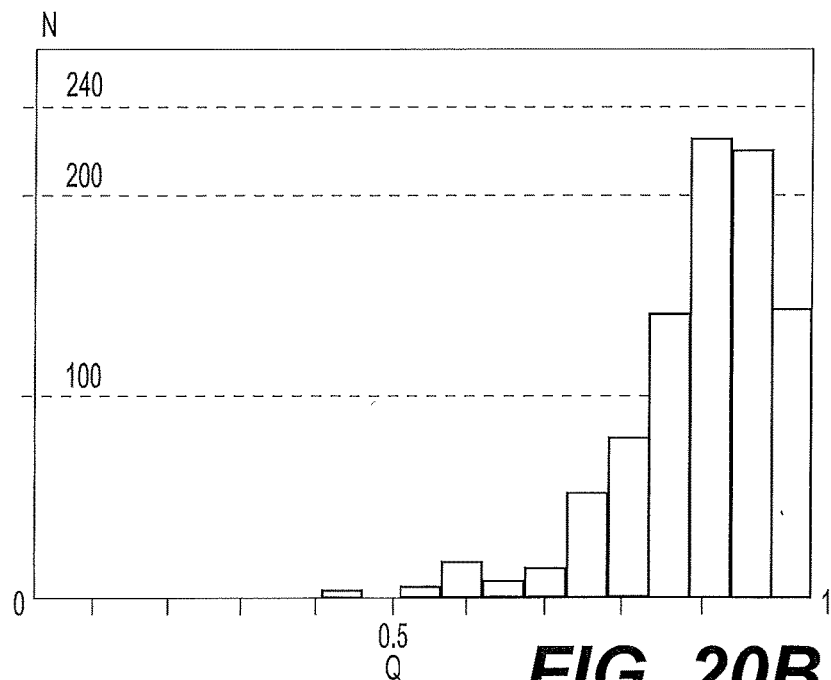
Figure 21:
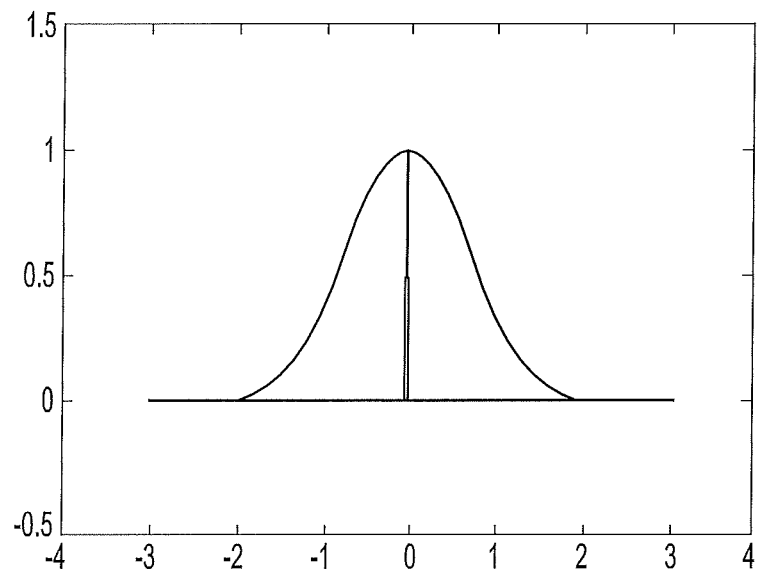
FIG. 21 is an illustration of the procedure for displacing the nodes in one dimension.

FIGS. 20A and 20B respectively comprises two histograms representing the distribution of the number N of mesh cells as a function of the value of their quality Q for an exemplary mesh of one and the same subterranean medium. The top figure 20A corresponds to the distribution according to the invention and the bottom figure 20B corresponds to the distribution obtained by the method of the prior art. It is noted that by virtue of the invention a more sizable number of mesh cells have a high quality (close to 1) and a lower number of mesh cells have a low quality (close to 0.5).

A mesh constructed according to the invention is particularly suitable for simulating the flows within a subterranean medium in a zone with complex geometry. The invention thus provides an accurate tool for carrying out a numerical representation of the subterranean medium (for example basin modeling). This representation of the medium allows in particular reservoir simulation, or simulations of injection of CO2 into a subterranean formation. A procedure for simulating the flows within a subterranean medium in a zone with complex geometry comprises the generation of a hexadominant mesh on the basis of the procedure according to the invention, and then the carrying out of simulations by suitable software (flow simulator, basin simulator or reservoir simulator) underpinned by the generated mesh.

These simulations allow testing several production schemes and then to optimizing oil field exploration, geological reservoir exploration or exploitation, or the injection of gas into subterranean media by carrying out the optimal production scheme (for example according to a criterion of profitability, volume of oil recovered, etc.). A simulated production scheme can correspond to the choice of the location of a new well (producer or injector), to the choice of tools (for drilling, exploration, etc.), to the choice of fluids used or recovered, to the choice of exploitation conditions (injection flowrate, etc.). The exploitation of the subterranean medium then carries out the choice that was made, such as, for example, the drilling of a new well, the injection of fluid, the modification of the exploitation and/or drilling conditions, etc.

Annex: Computation and Minimization of the Gradient of the Displacement Field

In order to better explain the procedure for computing and minimizing the gradient of the displacement field of the nodes of the grid, the following notations and definitions are introduced:

Consider an open region $\Omega_O$ of $R^2$ representing the surface $S_o$ to be optimized.

The surface $\Omega_O$ is said to be connected if no fault trace cuts it entirely.

If the surface is cut entirely by several fault traces, this surface may be regarded as a union of several connected components.

In this case, it may be written:

$$\Omega_0 = \bigcup_{n=1}^{N} C_n$$

where $C_n$ is a connected component.

Consider an open region $\Omega_R$ of $R^2$ representing the reference surface $S_R$ whose mesh is of good quality (reference grid).

Consider the deformation D: $\Omega_R \to \Omega_0$ such that each node NR of the boundary $\partial\Omega_R$ finds its image on a node $N_0$ of the boundary $\partial\Omega_0$ of the surface to be optimized.

$H^1(\Omega_R)$ is the set of functions u of $L^2(\Omega_R)$ such that $\nabla(u)$ is of $L^2(\Omega_R)$ with $$L^2(\Omega_R) = \left\{ f \text{ measurable on } \Omega \Big/ \int |f|^2 < \infty \right\}.$$

It may be assumed that the surface $\Omega_0$ is connected. If this surface is not connected, it suffices to perform an optimization on each of its connected components $C_n$.

Optimizing the mesh of the surface $\Omega_0$ minimizes the deformation of the displacement field from the surface $\Omega_R$ to the surface $\Omega_0$. Therefore, the following optimization problem should be solved:

Find the displacement field $\vec{u} = (u_1, u_2) \in H^1(\Omega_R) \times H^1(\Omega_R)$ imposed on the boundary of $\Omega_R$ and/or on the nodes of $\Omega_R$ whose image under D belongs to the rigid nodes (for example the traces of faults) such that:

$$J(u_m) = \min_{v_m \in H^1(\Omega_R)} J(v_m) \quad m = 1, 2 \qquad (1)$$

where:

$$J(v_m) = \left( \int_{\Omega_R} |\nabla v_m|^2 \, dM \right) \quad m = 1, 2.$$

Denote by $T^n$ the triangulation of the reference surface $\Omega_R$. It may therefore be written:

$$\Omega_R = \bigcup_{T \in T^n}^{T} \qquad (2)$$

where T is a triangle of $\Omega_R$ of area equal to ST.

Denote by $N_i$, $N_j$ and $N_k$ the three nodes of the triangle T and let M be an arbitrary point inside the triangle T. Therefore, it may be written:

$$\vec{OM} = \alpha \vec{ON_i} + \beta \vec{ON_j} + \gamma \vec{ON_k} \qquad (3)$$

With:

$$\alpha = \frac{\|\vec{MN_j} \wedge \vec{MN_k}\|}{2S_T}, \; \beta = \frac{\|\vec{MN_k} \wedge \vec{MN_i}\|}{2S_T}, \; \gamma = \frac{\|\vec{MN_i} \wedge \vec{MN_j}\|}{2S_T} \qquad (4)$$

The displacement field $\vec{v}(M) = (v_1(M), v_2(M))$ at the point M is such that:

$$v_m(M) = \alpha u_m(N_i) + \beta u_m(N_j) + \gamma u_m(N_k) \quad m=1,2 \qquad (5)$$

Where $\vec{u}(N_t) = (u_1(N_t), u_2(N_t))$ t=i, j, k represents the displacement field at the node $N_t$. Thus, the gradient of this displacement field is obtained:

$$\nabla v_m(M) = \nabla(\alpha) u_m(N_i) + \nabla(\beta) u_m(N_j) + \nabla(\gamma) u_m(N_k) \qquad (6)$$

From this the basis of equation (4) is deduced as:

$$\nabla v_m(M) = \frac{1}{2S_T}\begin{pmatrix}(y_j - y_k)u_m(N_i) + (y_k - y_i)u_m(N_j) + (y_i - y_j)u_m(N_k) \\ (x_k - x_j)u_m(N_i) + (x_i - x_k)u_m(N_j) + (x_j - x_i)u_m(N_k)\end{pmatrix} \quad (7)$$

According to (7), $\nabla v_m(M)$ is independent of x and y, therefore this gradient is constant over T. It can then be deduced:

$$\int_T |\nabla v_m|^2 dM = \quad (8)$$

$$\frac{1}{4S_T}(((y_j - y_k)u_m(N_i) + (y_k - y_i)u_m(N_j) + (y_i - y_j)u_m(N_k))^2 +$$

$$((x_k - x_j)u_m(N_i) + (x_i - x_k)u_m(N_j) + (x_j - x_i)u_m(N_k))^2)$$

We thus obtain a quadratic form on the triangle T that may be written:

$$\int_T |\nabla v_m|^2 dM = g_{jk}(u_m^j - u_m^k)^2 + g_{ik}(u_m^i - u_m^k)^2 + g_{ij}(u_m^i - u_m^j)^2 \quad (9)$$

where for t=i, j, k $u_m^t = u_m(N_t)$ and $$\begin{cases} g_{jk} = \frac{1}{2}\cot(\alpha_{jk}) \text{ with } \alpha_{jk} \text{ is the angle of} \\ \quad \text{the triangle opposite the edge } (N_j, N_k) \\ g_{ik} = \frac{1}{2}\cot(\alpha_{ik}) \text{ with } \alpha_{ik} \text{ is the angle of} \\ \quad \text{the triangle opposite the edge } (N_i, N_k) \\ g_{ij} = \frac{1}{2}\cot(\alpha_{ij}) \text{ with } \alpha_{ij} \text{ is the angle of} \\ \quad \text{the triangle opposite the edge } (N_i, N_j) \end{cases}$$

Figure 22:
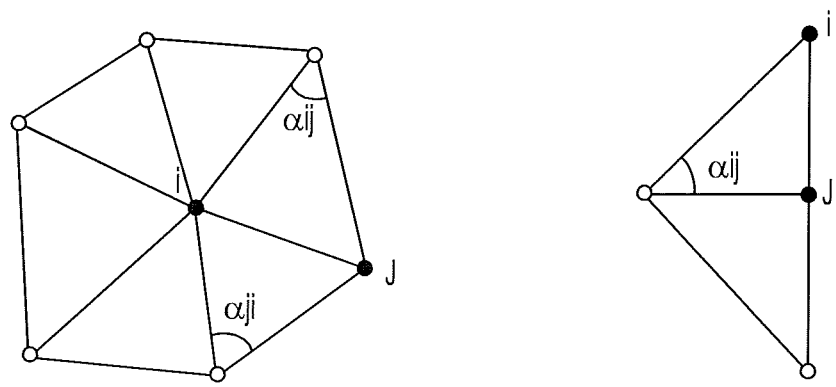
FIG. 22 illustrates the arrangement of the angles in the grid.

Ultimately, it is obtained from equation (9) and by definition of the adjacent mesh cells:

$$\int_{\Omega_R} |\nabla v_m|^2 dM = \sum_{T \in T^n} \int_T |\nabla v_m|^2 ds = \sum_i \sum_{j \leftrightarrow i} \omega_{ij}(u_m^j - u_m^i)^2 \quad (10)$$

where a summation over each node i of the triangulation and then over each node j connected to the node i by the edge $[N_i, N_j]$ is performed. This connection is denoted by $j \leftrightarrow i$ as is illustrated in FIG. 22. The weight functions are such that:

$$\begin{cases} \omega_{ij} = \frac{1}{2}(\cot(\alpha_{ij}) + \cot(\alpha_{ji})) & [N_i, N_j] \text{ is internal edge} \\ \omega_{ij} = \frac{1}{2}\cot(\alpha_{ij}) & [N_i, N_j] \text{ is a boundary edge} \end{cases} \quad (11)$$

Thus, the function to be minimized is a quadratic form whose variables are the displacement fields $u_m^i$ of each node $N_i$ of the reference surface. It is denoted by:

$$F(u_m^1, u_m^2, \ldots, u_m^{Nb}) = \sum_i \sum_{j \leftrightarrow i} \omega_{ij}(u_m^j - u_m^i)^2 \quad (12)$$

where Nb is the number of nodes of the reference surface. This function is a minimum if its gradient is zero, that is:

$$\frac{\partial F}{\partial u_m^i} = 0 \ \forall i = 1, \ldots, N_b \quad (13)$$

The minimization therefore amounts to solving the following system:

$$\sum_{j \leftrightarrow i} \omega_{ij}(u_m^j - u_m^i)^2 = 0 \ \forall i = 1, \ldots, N_b \quad (14)$$

that may also be written in the form:

$$u_m^i = \sum_{j \leftrightarrow i} \omega_{ij}^* u_m^j \ \forall i \quad (15)$$

with:

$$\omega_{ij}^* = \frac{\omega_{ij}}{\sum_{j \leftrightarrow i} \omega_{ij}} \text{ and } \sum_{j \leftrightarrow i} \omega_{ij}^* = 1$$

According to the invention, the approach involves three steps:

1. The first solves the following system by imposing the displacement field solely on the boundary of $\Omega_R$:

$$u_m^i - \sum_{\substack{j \leftrightarrow i \\ N_j \notin boundary}} \omega_{ij}^* u_m^j = \sum_{\substack{j \leftrightarrow i \\ N_j \in boundary}} \omega_{ij}^* u_m^j \ \forall i \quad (16)$$

that may be written in the form:
$$L^{(1)}U = B \quad (17)$$

where $L^{(1)}$ is a square matrix of order N equal to the number of nodes not belonging to the boundary of $\Omega_R$ such that:

$$L_{ij}^{(1)} = \begin{cases} 1 & i = j \\ -\omega_{ij}^* & j \leftrightarrow i \text{ where } N_j \text{ is not a node of the boundary} \\ 0 & (\overline{j \leftrightarrow i}) \text{ or } (N_j \text{ is a node of the boundary}) \end{cases} \quad (18)$$

with the right-hand side B of size N such that:

$$B_i = \sum_{\substack{j \leftrightarrow i \\ N_j \in boundary}} \omega_{ij}^* u_m^j \text{ for } i = 1, \ldots, N \quad (19)$$

2. The second step fits the rigid nodes other than those of the boundaries (for example the traces of faults) on the optimized mesh resulting from step 1.

3. After fitting the fault traces on the mesh, the third step solves the following system by imposing the displacement field not only on the boundary but also on the other rigid nodes (for example the traces of faults):

$$u_m^i - \sum_{\substack{j \leftrightarrow i \\ N_j \notin boundary \cup traces}} \omega_{ij}^* u_m^j = \sum_{\substack{j \leftrightarrow i \\ N_j \in boundary \cup traces}} \omega_{ij}^* u_m^j \; \forall \; i \quad (20)$$

that may be written in the form:

$$L^{(2)}U = T \quad (21)$$

where $L^{(2)}$ is a square matrix of order M equal to the number of nodes not belonging to the boundary and to the rigid nodes (for example the traces of faults) such that:

$$L_{ij}^{(1)} = \begin{cases} 1 & i = j \\ -\omega_{ij}^* & j \leftrightarrow i \text{ where } N_j \text{ is not a node of the boundary or of fault traces} \\ 0 & (\overline{j \leftrightarrow i}) \text{ or } (N_j \text{ is a node of the boundary) or } (N_j \text{ is a node of fault traces}) \end{cases}$$

with the right-hand side T of size M such that:

$$T_i = \sum_{\substack{j \leftrightarrow i \\ j \in boundary \cup traces}} \omega_{ij}^* u_m^j \text{ for } i = 1, \ldots, M \quad (22)$$

The right-hand sides B and T imply that the displacement field is imposed on the boundary in step 1 and on the boundary and the traces of faults in step 3. The matrices $L^{(1)}$ and $L^{(2)}$ occurring in the systems (17) and (21) are two sparse symmetric matrices since, in the ith row, all the coefficients are zero except for those j such that j is connected to i by an edge. Thus, band storage can be used for the storage of these two matrices. The adaptive Gauss Seidel procedure can be used to solve the two systems.

It is generally possible to find formula (11) for deformations in 2D or 3D and also for conformal unfoldings. The articles cited hereinbelow use them for this purpose. There are also other ways of approximating the Laplacian such as taking for example $$w_{ij} = \frac{1}{N_i},$$

where $N_i$ is the number of neighbors of node i.

Oscar Kin-Chung Au, Chiew-Lan Tai, Ligang Liu, and Hongbo Fu, "Dual Laplacian Editing for Meshes", IEEE TRANSACTIONS ON VISUALIZATION AND COMPUTER GRAPHICS, VOL. 12, NO. 3, pages 386-395, Hangzhou-China, MAY/JUNE 2006.

H. Masuda*, Y. Yoshioka, Y. Furukawa, "Interactive Mesh Deformation Using Equality-Constrained Least Squares", Tokyo, Japan, May 2006.

Mathieu Desbrun, Mark Meyer, Pierre Alliez, "Intrinsic Parameterizations of Surface Meshes", EUROGRAPHICS 2002, Volume 21, Number 2, Oxford UK, 2002.

Yanzhen Wang*, Kai Xu, Yueshan Xiong and Zhi-Quan Cheng, "2D shape deformation based on rigid square matching", COMPUTER ANIMATION AND VIRTUAL WORLDS, pages 411-420, Changsha-China, August 2008.

The algorithm can be tested on triangulated surfaces. A good distribution of the mesh cells after fitting is noted for an optimization performed with the Matlab® (Mathworks, USA) computation software. The reference horizon surface used is a Coons mesh generated starting from the boundary. The improvement in quality makes itself felt, especially when far from the boundary. A posteriori, the two parts separated by the traces of faults considered at the start to be connected components do not actually have the same uniformity of meshing. No folding is detected for this case because the deformations are not sufficiently imposing.

The invention claimed is:

1. A method for exploiting a subterranean medium, in which the subterranean medium is exploited according to an exploitation scheme defined using a representation of the medium, including a two-dimensional grid of mesh cells representing the subterranean medium, comprising:
    optimizing quality of the mesh cells of the two-dimensional grid by displacing nodes of the two-dimensional grid to minimize deformation of the two-dimensional grid by
    (a) generating a reference grid comprising a mesh solely of regular mesh cells which entirely covers the two-dimensional grid to be optimized by
        i) generating a two-dimensional grid comprising rectangles on the reference grid to be optimized,
        ii) orienting the two-dimensional grid in a direction of the reference grid to be optimized and wherein
        iii) the reference grid is transformed by rotation, by dilation and by translation to provide the reference grid with geometric properties identical to the two-dimensional grid to be optimized,
    (b) imposing a displacement of at least one rigid node of the reference grid on a corresponding node in the two-dimensional grid to be optimized, and
    (c) constructing an optimized two-dimensional grid by displacement of other nodes of the reference grid while minimizing a gradient of a displacement field of the nodes;
    minimizing deformation of the optimized two-dimensional grid by testing validity of the mesh of the optimized two-dimensional grid to detect folded surfaces in the grid and repeating steps (a) to (c) to eliminate the folded surfaces in the grid;
    generating at least one exploitation scheme by using the optimized two-dimensional grid having minimized deformation in a flow simulator; and
    exploiting the subterranean medium by using an exploitation scheme chosen from the generated at least one exploitation scheme.

2. A method according to claim 1, wherein a position of the at least one rigid node in the two-dimensional grid to be optimized is determined in accordance with geological or geometric considerations.

3. A method according to claim 2, wherein the at least one rigid node belongs to a boundary of the two-dimensional grid to be optimized or a node corresponding to a trace of a fault of the subterranean medium in the two-dimensional grid to be optimized.

4. A method according to claim 1, wherein the at least one rigid node belongs to a boundary of the two-dimensional grid to be optimized or a node corresponding to a trace of a fault of the subterranean medium in the two-dimensional grid to be optimized.

5. A method according to claim 1, comprising repeating steps (a) to (c) after a division by two of the displacement field.

6. A method according to claim 1, wherein the reference grid is transformed into a three-dimensional gridded surface by:
   i) determining for each node not situated on a fault, coordinates thereof based on barycentric coordinates of a node in a reference frame defined by a triangle of the 2D triangulated surface to which the node belongs;
   ii) determining for each node situated on a fault coordinates based on curvilinear abscissae measured on the fault; and
   iii) establishing connectivities between the nodes to maximize a number of quadrilaterals with only quadrilaterals for which a fault passes through one diagonals thereof being divided into two triangles.

7. A method according to claim 6, comprising:
   creating links between the nodes by linking each node of each three-dimensional gridded surface having identical coordinates and if a fault intersects the link linking a node with the fault by consideration of a direction of a neighboring node.

8. A method in accordance with claim 1, wherein the exploitation scheme comprises:
   performing at least one of optimizing oil field exploration, geological reservoir exploration, reservoir exploitation, choosing locations for drilling wells into the subterranean medium, choosing tools for drilling the wells and choosing injection of fluids.

9. A method for exploiting a subterranean medium according to an exploitation scheme using a representation of the medium, comprising a three-dimensional mesh with the subterranean medium comprising at least one sedimentary layer traversed by at least one fault with the at least one sedimentary layer being limited vertically by two geological horizons, comprising:
   a) constructing a representation of the medium by:
      i) discretizing the geological horizons with two triangulated three-dimensional surfaces;
      ii) transforming each triangulated three-dimensional surface into a triangulated two-dimensional surface onto which the at least one fault is projected by an isometric unfolding with the projected at least one fault forming segments describing an open curve;
      iii) generating a regular two-dimensional grid containing mesh cells for each triangulated two-dimensional surface;
      (iv) optimizing quality of the mesh cells of each regular two-dimensional grid by displacing nodes of the regular two-dimensional grid by a procedure minimizing deformation of the regular two-dimensional grid by
         (1) generating a reference grid comprising solely regular mesh cells and entirely covering the regular two-dimensional grid to be optimized by i) generating a two-dimensional grid comprising rectangles on the reference grid to be optimized, ii) orienting the two-dimensional grid in a direction of the reference grid to be optimized and wherein iii) the reference grid is transformed by rotation, by dilation and by translation to provide the reference grid with geometric properties identical to the two-dimensional grid to be optimized;
         (2) displacing nodes of the reference grid corresponding to rigid nodes of the regular two-dimensional grid to be optimized toward the rigid nodes with the rigid nodes being nodes of boundaries of the regular two-dimensional grid;
         (3) constructing an optimized two-dimensional grid by displacing other nodes of the reference grid while minimizing a gradient of displacement field of the nodes minimizing the deformation of the two-dimensional grid;
      v) deforming each optimized regular two-dimensional grid to fit nodes of the grid on a curve;
      vi) optimizing quality of the mesh cells of each deformed regular two-dimensional grid by displacing the nodes of the regular two-dimensional grid by minimizing deformation of the regular two-dimensional grid which comprises
         (1) generating another reference grid comprising a mesh solely of regular mesh cells which entirely covers the regular two-dimensional grid,
         (2) optimizing the nodes of another reference grid corresponding to the rigid nodes of the regular two-dimensional grid to be optimized by displacement toward the rigid nodes with the rigid nodes being nodes of boundaries of the regular two-dimensional grid and nodes of the curve, and
         (3) constructing an optimized regular two-dimensional grid by displacement of the other nodes of another reference grid, while minimizing a displacement field of the nodes;
      vii) performing a change of reference frame to transform each optimized deformed grid into a three-dimensional gridded surface and transforming each quadrilateral traversed by the fault into two triangles at a diagonal;
      viii) generating the mesh of the representation of the subterranean medium linking each node of each quadrilateral and of each triangle of two of the three-dimensional gridded surfaces and cutting each mesh cell traversed by the fault of the mesh of the subterranean medium;
      minimizing deformation of the optimized two-dimensional grid by testing validity of the mesh of the optimized two-dimensional grid to detect folded surfaces in the grid and repeating steps vi)(1) to vi)(3) to eliminate the folded surfaces in the grid;
   b) simulating generating at least one exploitation scheme by using the optimized two-dimensional grid having minimized deformation in a flow simulator to generate the exploitation scheme-with a representation of the medium and a flow simulator; and
   c) exploiting the subterranean medium by implementing an optimal using an exploitation scheme chosen from the generated at least one exploitation scheme.

10. A method according to claim 9, comprising repeating steps vi)(1) to vi)(3) after a division by two of the displacement field.

11. A method according to claim 9, wherein the regular grid is generated by:
   i) choosing four points on a periphery of the two-dimensional surface and defining four curves on the periphery;
   ii) choosing dimensions of the regular grid and discretizing each of the four curves as a function of the dimensions; and
   iii) applying the Coons formula to construct the regular grid.

12. A method according to claim 9, wherein for step v) before displacing a closest end, a test is carried out to verify that the displacement does provide a quadrilateral having at least one angle greater than a fixed angle threshold and if the at least one angle is greater, another end of the intersected edge is displaced.

13. A method according to claim 9, wherein the regular grid is transformed into a three-dimensional gridded surface by:
  i) determining for each node not situated on a fault coordinates thereof based on barycentric coordinates of a node in a reference frame defined by a triangle of the 2D triangulated surface to which the node belongs;
  ii) determining for each node situated on a fault coordinates based on curvilinear abscissae measured on the fault; and
  iii) establishing connectivities between the nodes to maximize a number of quadrilaterals with only quadrilaterals for which a fault passes through one diagonals thereof being divided into two triangles.

14. A method according to claim 9, comprising:
  creating links between the nodes by linking each node of each three-dimensional gridded surface having identical coordinates and if a fault intersects the link linking a node with the fault by consideration of a direction of a neighboring node.

15. A method in accordance with claim 9, wherein the exploitation scheme comprises:
  performing at least one of optimizing oil field exploration, geological reservoir exploration, reservoir exploitation, choosing locations for drilling wells into the subterranean medium, choosing tools for drilling the wells and choosing injection of fluids.

16. A computer program product stored on a non-transitory readable storage medium comprising program code which when executed on a computer or processor implements a method for exploiting a subterranean medium, according to an exploitation scheme defined using a representation of the medium, including a two-dimensional grid of mesh cells representing the subterranean medium, with quality of the mesh cells of the two-dimensional grid being optimized by displacing nodes of the two-dimensional grid by minimizing deformation of the grid when the program is executed, the method comprising:
  (a) generating a reference grid comprising a mesh solely of regular mesh cells which entirely covers the two-dimensional grid to be optimized, by
    i) generating a two-dimensional grid comprising rectangles on the reference grid to be optimized,
    ii) orienting the two-dimensional grid in a direction of the reference grid to be optimized and wherein
    iii) the reference grid is transformed by rotation, by dilation and by translation to provide the reference grid with geometric properties identical to the two-dimensional grid to be optimized,
  (b) imposing a displacement of at least one rigid node of the reference grid on a corresponding node in the two-dimensional grid to be optimized; and
  (c) constructing an optimized two-dimensional grid by displacement of other nodes of the reference grid while minimizing a gradient of a displacement field of the nodes;
  minimizing deformation of the optimized two-dimensional grid by testing validity of the mesh of the optimized two-dimensional grid to detect folded surfaces in the grid and repeating steps (a) to (c) to eliminate the folded surfaces in the grid;
  generating at least one exploitation scheme by using the optimized two-dimensional grid in a flow simulator; and
  exploiting the subterranean medium according to the optimized exploitation scheme.

17. A method in accordance with claim 16, wherein the exploitation scheme comprises:
  performing at least one of optimizing oil field exploration, geological reservoir exploration, reservoir exploitation, choosing locations for drilling wells into the subterranean medium, choosing tools for drilling the wells and choosing injection of fluids.

\* \* \* \* \*